United States Patent
Kaminosono et al.

(10) Patent No.: US 10,362,436 B2
(45) Date of Patent: Jul. 23, 2019

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventors: Takuya Kaminosono, Kyoto (JP); Yasuyuki Shimohata, Kyoto (JP); Kenichi Mae, Kyoto (JP); Kazuhiro Suzuki, Kyoto (JP); Takafumi Aoki, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 493 days.

(21) Appl. No.: 15/078,240

(22) Filed: Mar. 23, 2016

(65) Prior Publication Data

US 2016/0283056 A1    Sep. 29, 2016

(30) Foreign Application Priority Data

Mar. 24, 2015    (JP) .................................. 2015-061379

(51) Int. Cl.
G06Q 30/02    (2012.01)
H04W 4/02    (2018.01)

(52) U.S. Cl.
CPC .............. *H04W 4/02* (2013.01); *G06Q 30/02* (2013.01)

(58) Field of Classification Search
CPC .................................. H04W 4/02; G06Q 30/02
(Continued)

(56) References Cited

U.S. PATENT DOCUMENTS 7,927,253 B2 * 4/2011 Vincent .............. A63B 24/0021
                                                          482/9
8,108,144 B2 * 1/2012 Forstall .................. G01C 21/20
                                                          701/426
(Continued)

FOREIGN PATENT DOCUMENTS

JP    2002-288680    10/2002
JP    2007-104439    4/2007
(Continued)

OTHER PUBLICATIONS

Office Action issued in corresponding U.S. Appl. No. 15/078,208, filed Mar. 23, 2016, to Kaminosono et al., dated Apr. 27, 2018 (18 pages).
(Continued)

*Primary Examiner* — William D Titcomb
(74) *Attorney, Agent, or Firm* — Nixon & Vanderhye PC

(57) ABSTRACT

An example of an information processing system includes a plurality of user terminals and a server capable of communicating with each user terminal. The server transmits a content to the user terminal. The user terminal executes a first program for displaying a content, thereby displaying on a display apparatus the content received from the server. The user terminal stores related image information indicating a related image related to the content. When executing a second program, which is a program that is different from the first program and can be executed in the user terminal, the user terminal displays on the display apparatus an image by changing an image based on the second program, using the related image information.

11 Claims, 24 Drawing Sheets

(58) Field of Classification Search
USPC .......................................................... 715/744
See application file for complete search history.

(56) References Cited

U.S. PATENT DOCUMENTS

| | | | | |
|---|---|---|---|---|
| 8,175,802 B2* | 5/2012 | Forstall | .............. | G01C 21/3484 |
| | | | | 701/424 |
| 8,180,379 B2* | 5/2012 | Forstall | .................. | G01C 21/12 |
| | | | | 455/41.2 |
| 8,204,684 B2* | 6/2012 | Forstall | .................. | G01C 21/20 |
| | | | | 455/456.1 |
| 8,275,352 B2* | 9/2012 | Forstall | .............. | H04M 3/42365 |
| | | | | 455/404.2 |
| 8,290,513 B2* | 10/2012 | Forstall | .............. | H04M 1/72544 |
| | | | | 455/456.3 |
| 8,311,526 B2* | 11/2012 | Forstall | .............. | H04M 1/72572 |
| | | | | 455/414.3 |
| 8,332,402 B2* | 12/2012 | Forstall | .................. | G06Q 30/00 |
| | | | | 707/736 |
| 8,355,862 B2* | 1/2013 | Matas | ................ | G01C 21/3614 |
| | | | | 345/441 |
| 8,360,904 B2* | 1/2013 | Oleson | ............... | A63B 24/0062 |
| | | | | 473/570 |
| 8,369,867 B2* | 2/2013 | Van Os | .................. | H04W 4/02 |
| | | | | 370/310.2 |
| 8,385,946 B2* | 2/2013 | Forstall | .................. | G01C 21/26 |
| | | | | 455/456.6 |
| 8,514,816 B2* | 8/2013 | Bush | ........................ | G01S 5/02 |
| | | | | 370/334 |
| 8,644,843 B2* | 2/2014 | Canon | ...................... | G01S 5/02 |
| | | | | 455/456.1 |
| 8,702,430 B2* | 4/2014 | Dibenedetto | ....... | H04M 1/7253 |
| | | | | 434/247 |
| 8,762,056 B2* | 6/2014 | Forstall | .............. | G01C 21/3484 |
| | | | | 340/995.13 |
| 8,977,294 B2* | 3/2015 | De Atley | ................ | H04M 1/66 |
| | | | | 340/539.13 |
| 9,109,904 B2* | 8/2015 | Forstall | .................. | G01C 21/20 |
| 9,250,092 B2* | 2/2016 | Blumenberg | ...... | G01C 21/3614 |
| 9,454,766 B2* | 9/2016 | Miyabayashi | ......... | G06Q 30/02 |
| 9,536,246 B2* | 1/2017 | Saito | ....................... | G06Q 30/02 |
| 9,678,660 B2* | 6/2017 | Beaurepaire | ......... | G01C 21/367 |
| 9,702,709 B2* | 7/2017 | Forstall | .............. | G01C 21/3617 |
| 9,848,236 B2 | 12/2017 | Villoria | | |
| 9,860,368 B2 | 1/2018 | Aggarwal | | |
| 10,062,297 B2* | 8/2018 | Dibenedetto | .......... | G16H 15/00 |
| 2002/0007313 A1 | 1/2002 | Mai et al. | | |
| 2008/0281903 A1 | 11/2008 | Kwiatkowski | | |
| 2009/0005981 A1* | 1/2009 | Forstall | .................. | G01C 21/20 |
| | | | | 701/431 |
| 2010/0087230 A1* | 4/2010 | Peh | ..................... | G06F 3/04817 |
| | | | | 455/566 |
| 2012/0310530 A1* | 12/2012 | Lee | ........................ | G01C 21/20 |
| | | | | 701/439 |
| 2012/0311596 A1 | 12/2012 | Imai et al. | | |
| 2014/0331243 A1 | 11/2014 | Villoria | | |
| 2014/0342329 A1* | 11/2014 | Debenedetto | .......... | G16H 50/30 |
| | | | | 434/247 |
| 2016/0171511 A1 | 6/2016 | Goel | | |
| 2016/0260188 A1 | 9/2016 | Harouche | | |

FOREIGN PATENT DOCUMENTS

| | | |
|---|---|---|
| JP | 2008-021303 | 1/2008 |
| JP | 2009-092606 | 4/2009 |
| JP | 2010-532885 | 10/2010 |
| JP | 2012-511187 | 5/2012 |
| JP | 2012-253617 | 12/2012 |
| JP | 2013-009058 | 1/2013 |
| WO | WO 2008/148112 | 12/2008 |
| WO | WO 2010/068632 | 6/2010 |

OTHER PUBLICATIONS

Office Action dated Nov. 21, 2018 issued in U.S. Appl. No. 15/078,208 (15 pgs.).
Office Action dated Mar. 14, 2019 issued in U.S. Appl. No. 15/078,208 to Kaminosono filed Mar. 23, 2016 (16 pages).
Notice of Reasons for Refusal dated Feb. 28, 2019 issued in JP 2015-061379 (8 pages).
Notice of Reasons for Refusal dated Feb. 28, 2019 issued in JP 2015-061378 (8 pages).

* cited by examiner

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2015-061379, filed on Mar. 24, 2015, is incorporated herein by reference.

FIELD

The technology relates to an information processing system, an information processing apparatus, a storage medium having stored therein an information processing program, and an information processing method for causing a server to provide information for a terminal used by a user.

BACKGROUND AND SUMMARY

Conventionally, there is a technique for transmitting a content from a server to a terminal used by a user.

When the content is transmitted to the terminal used by the user, it is desirable to change the terminal, for example, in accordance with the content viewed in the terminal.

Therefore, the present application discloses an information processing system, an information processing apparatus, a storage medium having stored therein an information processing program, and an information processing method that are capable of changing a terminal in accordance with a content viewed in the terminal.

(1)

An example of an information processing system according to the present specification includes a plurality of user terminals and a server capable of communicating with each user terminal. One or more processors included in the server transmits a content to the user terminal. One or more processors included in the user terminal: executes a first program for displaying a content, thereby displaying on a display apparatus the content received from the server; stores, in a storage medium, related image information indicating a related image related to the content; and when executing a second program, which is a program that is different from the first program and can be executed in the user terminal, displays on the display apparatus an image by changing an image based on the second program, using the related image information.

(2)

The second program may be a game program. The one or more processors included in the user terminal may display on the display apparatus a related image of an item related to the content.

(3)

The second program may be a program for displaying a map image representing a real world or a virtual world. The content may be associated with a position in the real world or the virtual world. The one or more processors included in the user terminal displays the related image at the position associated with the content.

(4)

The second program may be a program for displaying a menu image for giving an instruction to execute an application program. The one or more processors included in the user terminal may change at least part of a user interface image and/or a background image that are included in the menu image.

(5)

In accordance with the fact that the content is received from the server by the user terminal, the one or more processors included in the user terminal may permit the second program to display a related image regarding the content.

(6)

In accordance with the fact that the content is reproduced in the user terminal, the one or more processors included in the user terminal may permit the second program to display a related image regarding the content.

(7)

Based on position information regarding a position of the user terminal, the one or more processors included in the user terminal may determine whether or not a user visits a place regarding the content. The one or more processors included in the user terminal may permit the second program to display a related image regarding the content regarding which the place is visited by the user according to the determination.

(8)

In accordance with a state of viewing the content in the user terminal, the one or more processors included in the user terminal may change a display form of a related image.

(9)

Based on position information regarding a position of the user terminal, the one or more processors included in the user terminal may determine whether or not a user visits a place regarding the content. The one or more processors included in the user terminal may change a display form of a related image regarding the content regarding which the place is visited by the user according to the determination.

(10)

Another example of an information processing system according to the present specification includes a plurality of user terminals and a server capable of communicating with each user terminal. One or more processors included in the server: transmits a content to the user terminal; acquires viewing information indicating a state of viewing the content in the user terminal; stores, in a storage medium with respect to each user, point information indicating a point to be given to the user of the user terminal based on the viewing information regarding the user terminal; and transmits content data to the user in exchange for the point. One or more processors included in the user terminal: displays on a display apparatus the content received from the server; transmits the viewing information of the content to the server; and transmits to the server a request to acquire content data specified by the user in exchange for the point, and in accordance with the request, acquiring the content data transmitted from the server.

It should be noted that the present specification discloses an example of an information processing apparatus (for example, a user apparatus described later) or a server included in the information processing system in the above (1) to (10). Further, the present specification discloses an example of a storage medium having stored therein an information processing program causing a computer of the information processing apparatus or a server to function as some of means in the above (1) to (10). Further, the present specification discloses an example of an information processing method to be executed by the information processing system, an information processing apparatus, or a server.

As described above, according to the information processing system, the information processing apparatus, the storage medium having stored therein the information processing program, and the information processing method, it is possible to change a terminal in accordance with a content viewed in the terminal.

These and other objects, features, aspects and advantages of the example embodiments will become more apparent from the following detailed description of the example embodiments when taken in conjunction with the accompanying drawings.

DETAILED DESCRIPTION OF NON-LIMITING EXAMPLE EMBODIMENTS

1. Configuration of Information Processing System

Figure 1:
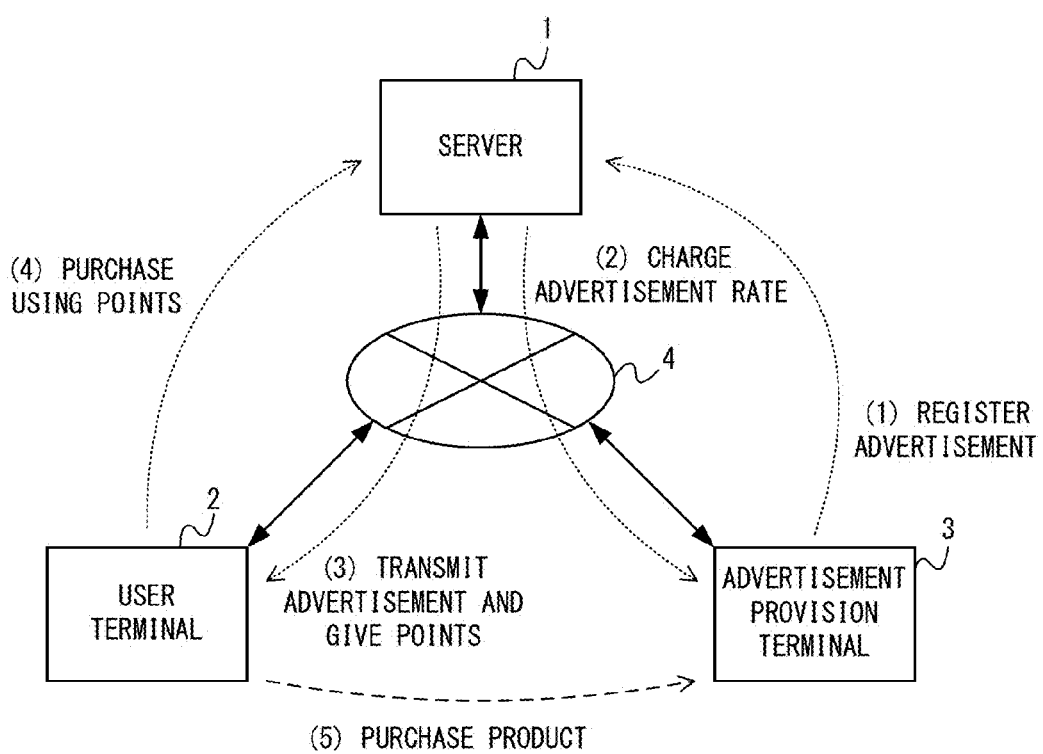
FIG. 1 is a block diagram showing a non-limiting example of the configuration of an information processing system according to an example embodiment.

A description is given below of an information processing system, an information processing apparatus, an information processing program, and an information processing method according to an example embodiment. FIG. 1 is a block diagram showing an example of the configuration of the information processing system according to the example embodiment. As shown in FIG. 1, the information processing system includes a server (server system) 1, a user terminal 2, and an advertisement provision terminal 3. The apparatuses 1 to 3 can communicate with each other via a network 4. It should be noted that FIG. 1 shows only one user terminal 2 and only one advertisement provision terminal 3. The information processing system, however, includes a plurality of user terminals and a plurality of advertisement provision terminals.

The server 1 stores an advertisement content (hereinafter occasionally referred to as an "advertisement") and provides the advertisement for the user terminal 2. The advertisement (the content) is a content including an image and/or a sound, and may be a moving image, a still image, or a content including only a sound. Although the details will be described later, in the example embodiment, the server 1 provides the user terminal 2 with an advertisement that meets a condition. For example, a user passes in front of a certain shop, an advertisement regarding the shop is provided for a user terminal 2 of the user.

Further, the server 1 provides a network service for (a user of) the user terminal 2. A specific example of the network service is optional. In the example embodiment, the server 1 performs a network service for providing a product (for example, an application, a content, or the like) using points (for example, a virtual currency). In another example embodiment, a product or a service to be provided using points (in exchange for points) is not limited to what is provided via a network.

The user terminal 2 is an information processing apparatus owned by a user of the network service (for example, a user allowed to use the network service, more specifically, a user having an account for the network service). In the example embodiment, the user terminal 2 is a mobile (or portable) terminal. In the example embodiment, the user terminal 2 is a dedicated terminal capable of using the network service. Alternatively, in another example embodiment, the user terminal 2 may be a general-purpose information processing terminal such as a mobile phone, a smartphone, or a tablet terminal. Further, the user terminal 2 is a so-called multifunctional terminal. That is, the user terminal 2 has some of the various functions (for example, an input function, an output (for example, display) function, an information processing function, a network communication function, a call function, a camera function, and the like) of a general multifunctional device. The user terminal 2 has the function of receiving an advertisement from the server 1 and reproducing the received advertisement.

The advertisement provision terminal 3 is any information processing apparatus owned by an advertiser who provides an advertisement. In the example embodiment, the advertisement provision terminal 3 is a terminal apparatus of the same type as the user terminal 2 (for example, the above dedicated terminal capable of using the network service). Alternatively, in another example embodiment, the advertisement provision terminal 3 may be a terminal apparatus of a different type from the user terminal 2, or may be a general-purpose information processing terminal. The advertisement provision terminal 3 transmits an advertisement created by the advertiser to the server 1.

In the example embodiment, the advertiser of the advertisement provision terminal 3 requests the server 1 to register an advertisement to be transmitted from the server 1 to the user terminal 2 ((1) shown in FIG. 1). At this time, the server 1 charges the advertiser an advertisement rate ((2) shown in FIG. 1). In this manner, advertisements from a plurality of advertisements provision terminals 3 are registered (stored) in the server 1. Further, although the details will be described later, for each of the registered advertisements, a condition for transmitting the advertisement to the user terminal 2 (a transmission condition) is set.

Meanwhile, the user moves carrying the user terminal 2 with the user. In the example embodiment, as a result of the movement of the user (the user terminal 2), a transmission condition may be satisfied. For example, if the user passes in front of a shop related to an advertisement, or the user passes through the closest station to the shop, a transmission condition may be satisfied. If the user terminal 2 satisfies a transmission condition, the server 1 transmits an advertisement corresponding to the transmission condition to the user terminal 2 ((3) shown in FIG. 1). The user terminal 2 reproduces the advertisement received from the server 1 in accordance with an instruction from the user. In the example embodiment, the server 1 gives points to the user in accordance with the fact that the user terminal 2 reproduces the advertisement ((3) shown in FIG. 1). These points can be used in the above network service.

The user can use these points when purchasing a product in the network service ((4) shown in FIG. 1). Further, the user can watch the advertisement reproduced in the user terminal 2 and purchase a product related to the advertisement or receive a service related to the advertisement (aside from the purchase of the product in the network service) ((5) shown in FIG. 1).

As described above, in the example embodiment, an advertiser can provide an advertisement for a user satisfying a transmission condition, and therefore can efficiently provide an advertisement and effectively obtain advertising effectiveness. On the other hand, by viewing (reproducing) an advertisement, a user can obtain points that can be used in the network service. As described above, in the example embodiment, it is possible to provide a user with a motivation to watch an advertisement, and therefore to effectively obtain advertising effectiveness. Further, the information processing system provides an advertisement that meets the condition of the user, and therefore can provide an advertisement useful for the user.

Figure 2:
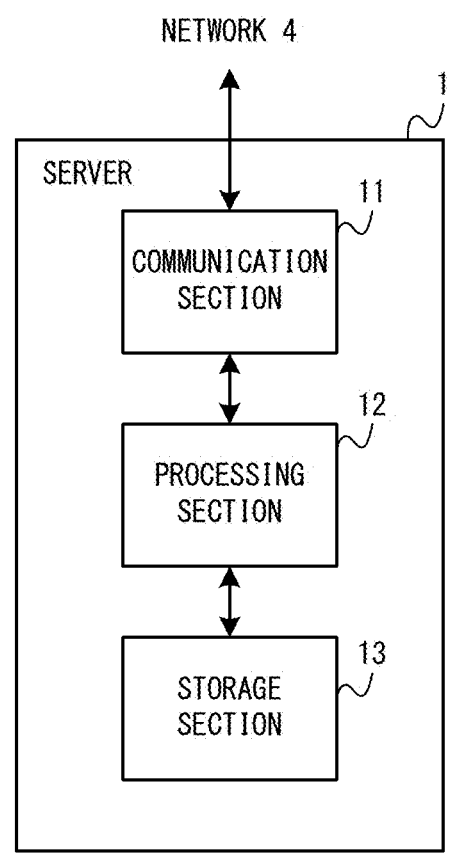
FIG. 2 is a block diagram showing a non-limiting example of the configuration of a server.

Next, a description is given of a specific example of the configuration of each apparatus included in the information processing system. FIG. 2 is a block diagram showing an example of the configuration of the server. As shown in FIG. 2, the server 1 includes a communication section 11, which transmits and receives data to and from external apparatuses (the user terminal 2 and the advertisement provision terminal 3) via the network 4. In the example embodiment, the network 4 is the Internet, and the communication section 11 has the function of connecting to the Internet.

The server 1 includes a processing section 12, which executes various types of information processing. In the example embodiment, the processing section 12 includes a CPU (Central Processing Unit) and a memory. Using the memory, the CPU executes an information processing program stored in the server 1, thereby executing the above various types of information processing. Further, the server 1 includes a storage section 13, which stores various types of data saved in the server 1. The storage section 13 stores, as the above various types of data, user information regarding a user, advertisement information regarding a registered advertisement, and the like (see FIG. 7).

It should be noted that information of part of the user information and the advertisement information stored in the server 1 may be manually input by a server administrator. Thus, the server 1 may include an input section and an output section (for example, a display section) as user interfaces for the server administrator to provide an input.

In the example embodiment, a description is given on the assumption that the server 1 is configured in an integrated manner. Alternatively, the server 1 may be configured to include a plurality of server apparatuses (for example, information processing apparatuses) divided in accordance with functions and/or roles. In the present specification, the "server" means a single server apparatus (for example, information processing apparatus), or if the server includes a plurality of server apparatuses, means the entirety of the server apparatus group (for example, the server system). For example, the server 1 may be configured to include a data server for storing an advertisement, and a service server for providing the network service. Further, the server 1 may be configured to, if performing a service for providing a product or the like as part of the above network service ("A product or the like" means a service as well as a product. The same applies to the following.), include a shop server for providing the product or the like and charging money.

Figure 3:
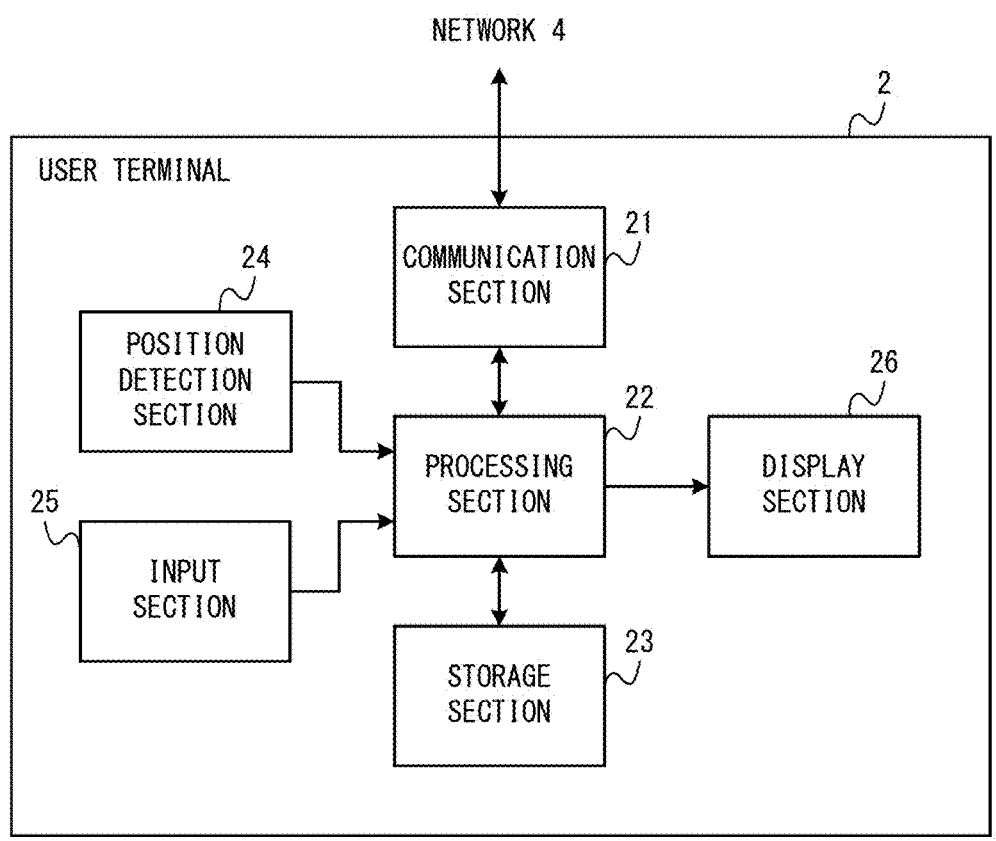
FIG. 3 is a block diagram showing a non-limiting example of the configuration of a user terminal.

FIG. 3 is a block diagram showing an example of the configuration of the user terminal 2. As shown in FIG. 3, the user terminal 2 includes a communication section 21, which transmits and receives data to and from the server 1 via the network 4. In the example embodiment, the communication section 21 has the function of connecting to the Internet. For example, the communication section 21 may be a communication module for performing communication on the Internet via a wireless LAN. Further, the communication method between the user terminal 2 and an external apparatus (for example, the server 1) is any method. For example, in another example embodiment, the communication section 21 may perform communication via a mobile communication network.

The user terminal 2 includes a processing section 22. The processing section 22 executes various types of information processing to be executed by the user terminal 2. The processing section 22 includes a CPU (Central Processing Unit) and a memory. In the user terminal 2, using the memory, the CPU executes an information processing program stored in the user terminal 2, thereby executing the above various types of information processing. It should be noted that in the example embodiment, the user terminal 2 stores a system program for displaying a menu image described later, and an advertisement viewing application, which is an application program for viewing an advertisement. Further, the user terminal 2 may store other application programs such as a map display program described later and a game program. The CPU of the processing section 22 executes these various programs.

The user terminal 2 includes a storage section 23, which stores various types of data for use in the user terminal 2. In the example embodiment, the storage section 23 stores data of an advertisement received from the server 1, data of position history information described later, and the like (see FIG. 8).

The user terminal 2 includes a position detection section 24, which detects position information regarding the position of the user terminal 2. In the example embodiment, the position detection section 24 detects the position information using a GNSS (Global Navigation Satellite System). The position detection section 24 is a so-called GNSS sensor such as a GPS (Global Positioning System) sensor (GPS module). Here, the "position information regarding the position" may be information indicating the position, or may be information allowing the identification of the position. The position information may be, for example, information indicating latitude and longitude, or information that is transmitted from a GPS satellite and allows the specifying of the position (for example, time information regarding when a radio wave is transmitted, or orbit information of the satellite).

It should be noted that the position detection method by the position detection section 24 is any method. The position detection section 24 may detect the position, for example, using a beacon. That is, the position detection section 24 may detect the position based on a signal from a beacon terminal at a transmitting end, which is installed in a shop of the advertiser. Further, for example, the position detection section 24 may detect the position based on a radio wave from a wireless communication facility. That is, the position detection section 24 may detect the position based on a radio wave from a mobile phone base station or a radio wave from a wireless access point. Further, for example, the position detection section 24 may detect the motion of the user terminal 2 using an acceleration sensor or the like and detect (or calculate) the position based on the detection result. Alternatively, the position detection section 24 may detect the position based on an image captured by a camera (for example, an image representing the surroundings of the user terminal 2), or may detect the position based on a sound in the surroundings detected by a microphone. Yet alternatively, the position detection section 24 may detect the position by acquiring information representing the position of the user terminal 2 from another apparatus different from the user terminal 2.

The user terminal 2 includes an input section 25, which receives an input provided by the user. The input section 25 is any input device such as a touch panel, a button, or a stick. Further, the user terminal 2 includes a display section 26.

It should be noted that as described above, in the example embodiment, the advertisement provision terminal 3 is an information processing apparatus of the same type as the user terminal 2, and therefore, the configuration of the advertisement provision terminal 3 is not described in detail here.

2. Operation of Information Processing System (2-1. Overview of Operation of Information Processing System)

Figure 4:
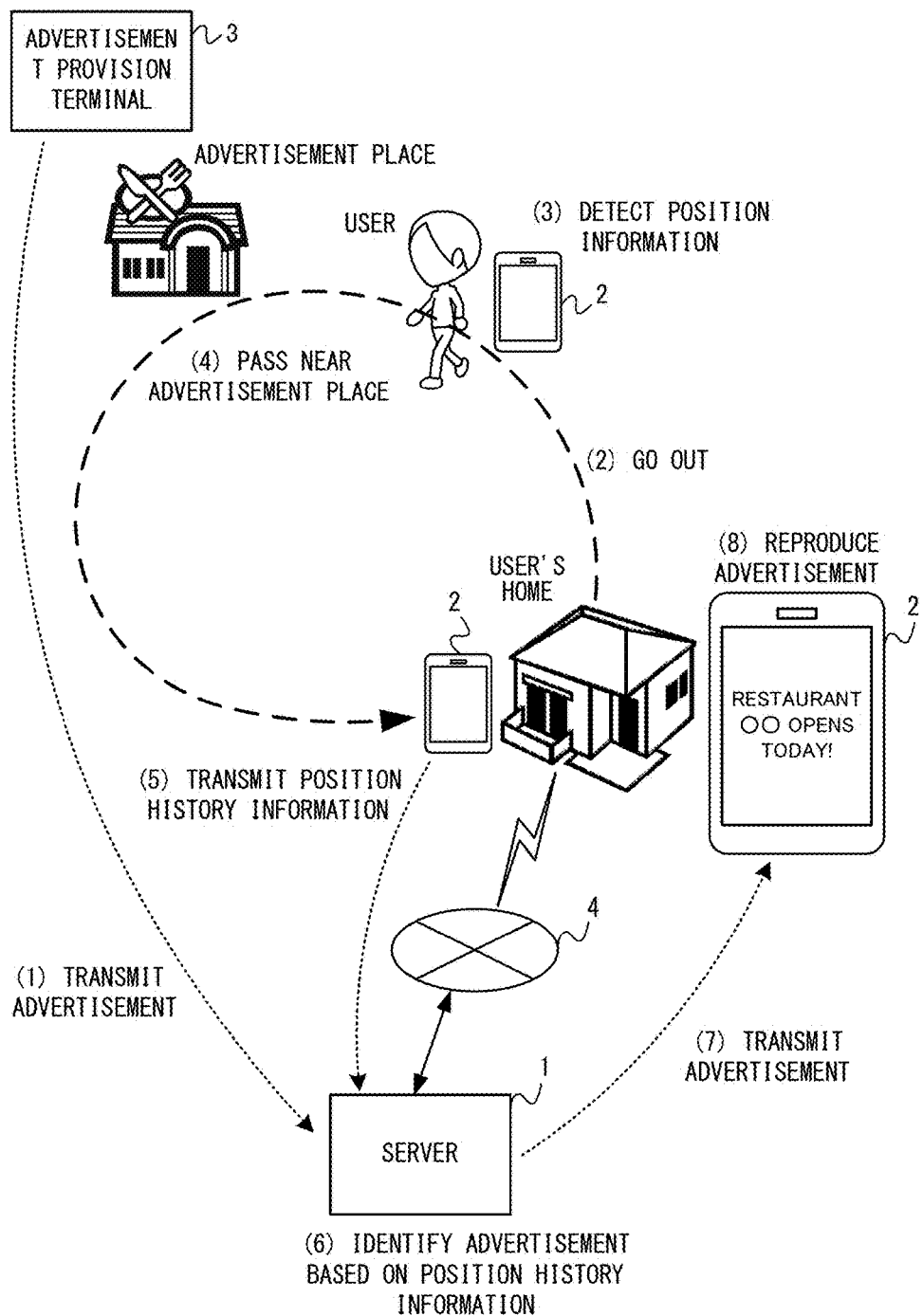
FIG. 4 is a diagram showing a non-limiting example of the operation of the information processing system.

Next, a description is given of an overview of the operation of the information processing system. FIG. 4 is a diagram showing an example of the operation of the information processing system. In the example embodiment, first, the advertiser creates an advertisement and transmits an advertisement registration request including the created advertisement to the server 1, using the advertisement provision terminal 3 ((1) shown in FIG. 4). Although the details will be described later, the advertisement registration request is used to request the server 1 to register an advertisement to be transmitted to the user terminal 2. It should be noted that in the example embodiment, the advertisement registration request includes an advertisement and a transmission condition set for the advertisement (see FIG. 6). Receiving this advertisement registration request, the server 1 stores (registers) the advertisement and the transmission condition in association with each other.

Meanwhile, the user goes out carrying the user terminal 2 with the user ((2) shown in FIG. 4). While the user is out, the user terminal 2 successively detects position information indicating the position of the user terminal 2 and stores the position information ((3) shown in FIG. 4). Consequently, the history of the position while the user is out is stored as position history information in the user terminal 2. It should be noted that in the example shown in FIG. 4, the user passes near a place regarding the advertisement (referred to as an "advertisement place") ((4) shown in FIG. 4). The advertisement place may be, for example, the place of a shop related to the advertisement, or the place of the closest station to a shop related to the advertisement or the like.

In the example shown in FIG. 4, the user returns home and then performs on the user terminal 2 the operation of starting the above advertisement viewing application. In response to this, the user terminal 2 starts the advertisement viewing application and transmits to the server 1 the position history information indicating the history of the position while the user is out ((5) shown in FIG. 4). It should be noted that in the example embodiment, it is assumed that an access point of a wireless LAN is installed in the user's home so that the user terminal 2 can communicate with the server 1 by connecting to the network 4 via the access point.

Receiving the position history information from the user terminal 2, then based on the received position history information, the server 1 identifies an advertisement to be transmitted to the user terminal 2 ((6) shown in FIG. 4). Specifically, based on the position history information, the server 1 determines whether or not a transmission condition stored in association with a registered advertisement is satisfied, and then identifies an advertisement for which the transmission condition is satisfied. Further, the server 1 transmits the identified advertisement to the user terminal 2 ((7) shown in FIG. 4). Consequently, an advertisement regarding the advertisement place near which the user has passed when the user went out is transmitted from the server 1 to the user terminal 2. Receiving the advertisement from the server 1, the user terminal 2 reproduces the advertisement in accordance with a reproduction instruction from the user ((8) shown in FIG. 4).

By the above operation, the server 1 can provide the user terminal 2 with an advertisement corresponding to the position of the user (for example, the place by which the user has passed) and efficiently provide an advertisement by narrowing down advertisement target users. In the above example, for example, if the user passes near an advertisement place (for example, a shop regarding an advertisement) while the user is out, an advertisement corresponding to the advertisement place is transmitted to and reproduced in the user terminal 2 (for example, by the user giving an instruction to reproduce the advertisement). That is, for a user having actually passed near a shop, an advertisement of the shop is provided.

(2-2. Process of Registering Advertisement Content)

Figure 5:
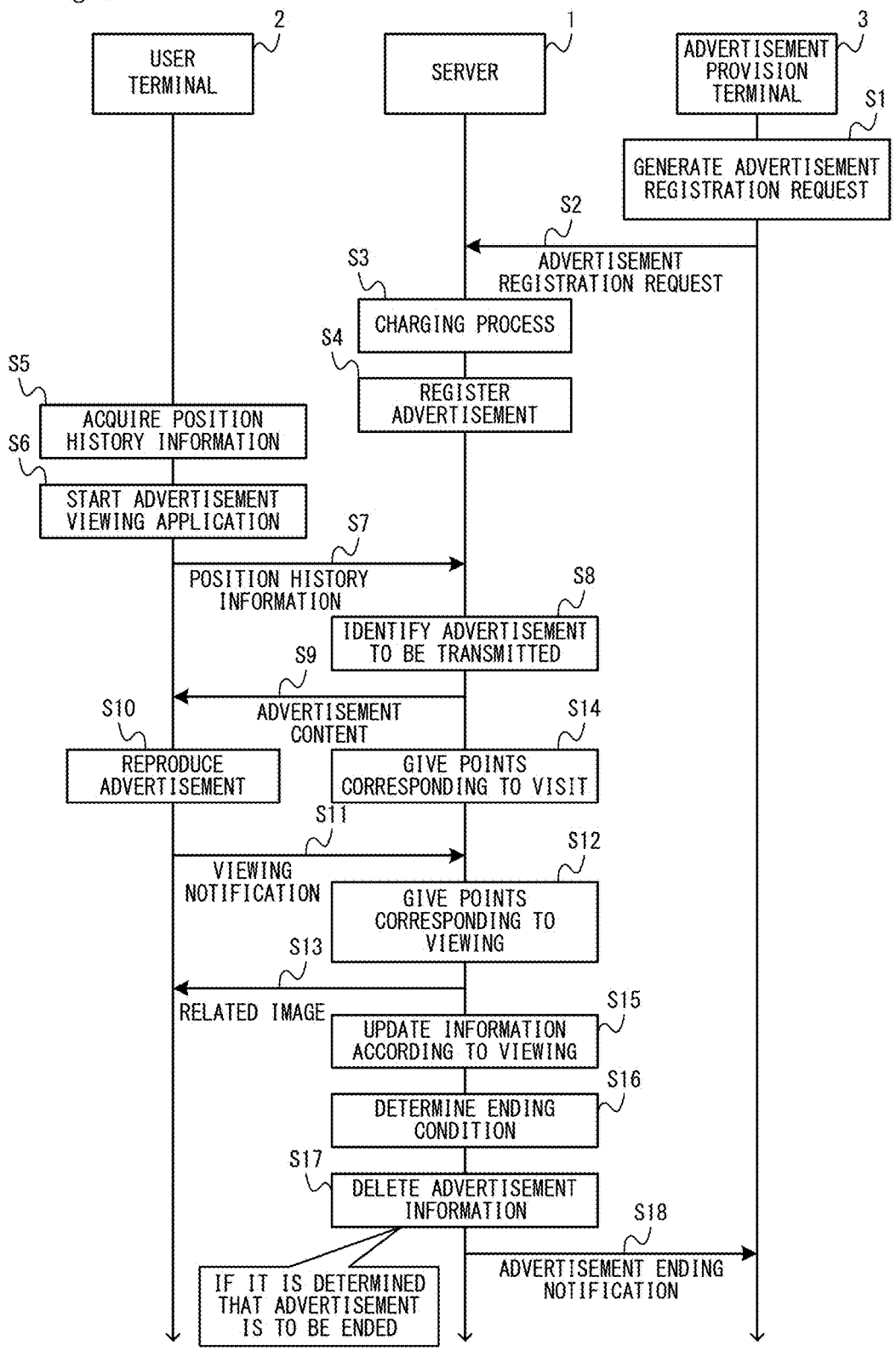
FIG. 5 is a diagram showing a non-limiting example of the flow of the operation in a case where an advertisement content provided for the server by an advertisement provision terminal is reproduced in the user terminal.

A description is given below of a specific example of the operation of the information processing system. FIG. 5 is a diagram showing an example of the flow of an operation in a case where an advertisement content provided for the server 1 by the advertisement provision terminal 3 is reproduced in the user terminal 2. First, with reference to steps S1 to S4 shown in FIG. 5, a description is given of an example of an operation in which the server 1 registers an advertisement in accordance with a request from the advertisement provision terminal 3.

Referring to FIG. 5, the advertisement provision terminal 3 generates an advertisement registration request in accordance with an instruction from the advertiser (step S1). The advertisement registration request is used to request the server 1 to register an advertisement in the server 1, that is, transmit to the user terminal 2 an advertisement for which the transmission condition is satisfied.

Figure 6:
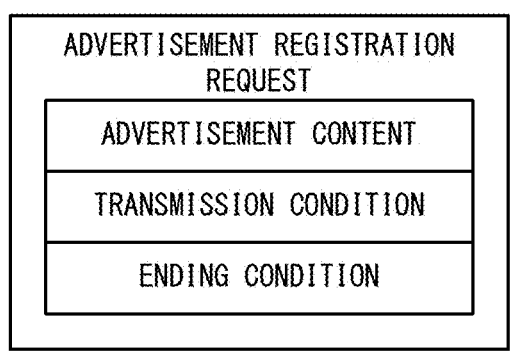
FIG. 6 is a diagram showing a non-limiting example of information included in an advertisement registration request.

FIG. 6 is a diagram showing an example of information included in the advertisement registration request. As shown in FIG. 6, in the example embodiment, the advertisement registration request includes an advertisement (content), a transmission condition, and an ending condition. The advertisement content is content data (for example, a moving image, a still image, a sound, and the like) of an advertisement to be reproduced. It should be noted that in the example embodiment, it is assumed that the advertisement content includes the title of the advertisement. In the example embodiment, the advertisement content is created by the advertiser in advance. The method for creating the advertisement content is any method.

The transmission condition is a condition for transmitting the advertisement to the user terminal 2. In the example embodiment, the transmission condition is a condition regarding the position of the user terminal 2, and more specifically, is a condition regarding the positional relationship between the user terminal 2 and the advertisement place. For example, the transmission condition is that the user terminal 2 passes through a predetermined range with respect to the advertisement place. It should be noted that the transmission condition may include another condition in addition to (or instead of) the condition regarding the position of the user terminal 2 (see "(Variation Regarding Transmission Condition)" in "[6. Variations]" described later).

The ending condition is a condition for ending the registration of the advertisement (the period in which the advertisement can be transmitted to the user terminal 2). In the example embodiment, the ending condition is a condition regarding the number of users having viewed the advertisement (the number of viewing users), that is, the number of user terminals 2 having reproduced the advertisement. For example, the ending condition is that the number of viewing users reaches a predetermined number. According to this condition, the advertisement is registered in the server 1 until a predetermined number of users watch the advertisement. Thus, the advertiser can obtain advertising effectiveness corresponding to the advertisement rate.

It should be noted that in another example embodiment, the ending condition is not limited to the condition regarding the number of viewing users, and may be another condition. For example, the ending condition may be the following conditions.

A condition regarding the number of user terminals 2 to which the advertisement is transmitted (for example, that the advertisement is transmitted to a predetermined number of user terminals 2)

A condition regarding the number of times the advertisement is reproduced (for example, that the advertisement is reproduced a predetermined number of times)

A condition regarding the number of users having actually visited the advertisement place (the number of visiting users) (for example, that the number of visiting users reaches a predetermined number)

A condition regarding the period in which the advertisement is registered (for example, that October arrives (in a case where the advertisement is registered until the end of September))

In the example embodiment, an advertisement (content), a transmission condition, and an ending condition are set by the advertiser, thereby generating an advertisement registration request. The advertisement provision terminal 3 transmits the generated advertisement registration request to the server 1 (step S2). It should be noted that an advertisement registration request may be able to be generated and transmitted by the above advertisement viewing application. That is, the function of receiving, from the advertiser, inputs of various types of information (for example, an advertisement content, a transmission condition, and an ending condition) to be included in an advertisement registration request, generating an advertisement registration request based on the input information, and transmitting the advertisement registration request to the server 1 may be built into the advertisement viewing application. Further, regarding the transmission condition and/or the ending condition, a plurality of types of conditions may be prepared in advance in the advertisement viewing application, and the advertiser may select one of the plurality of types of conditions, thereby setting these conditions.

As described above, in the example embodiment, a transmission condition (and an ending condition) is included in an advertisement registration request, and therefore is set by the advertiser. This enables the advertiser to set desired conditions, and therefore provide an advertisement for the user by reflecting the advertising strategy of the advertiser.

In the example embodiment, if the above advertisement registration request is transmitted from the advertisement provision terminal 3 to the server 1, the server 1 executes a charging process regarding the charging for the advertisement rate (step S3). In the example embodiment, it is assumed that the advertiser has points (for example, a virtual currency) that can be used in the network service, and pays the advertisement rate using the points. That is, the server 1 updates information indicating the points of the advertiser by subtracting the number of points corresponding to the advertisement rate. It should be noted that the method for charging (paying) the advertisement rate is any method, and may be performed by a conventional charging method. For example, the charging method may be a method for transferring the advertisement rate through a bank. Alternatively, the payment and the charging for the advertisement rate may not be performed by information processing by the server 1 and/or the advertisement provision terminal 3, but may be performed manually.

The advertisement rate may be set in accordance with the above advertisement registration request (for example, the advertisement, the transmission condition, and/or the ending condition). For example, the server 1 may set the advertisement rate in accordance with the reproduction time of the advertisement content that is a moving image, the breadth of a predetermined range in the transmission condition, and/or the magnitude of the number of viewing users set in the ending condition.

Further, in the example embodiment, the process regarding charging is executed after the advertisement provision terminal 3 transmits the advertisement registration request. However, the execution timing of the process is any timing. In another example embodiment, the process regarding charging may be executed before the advertisement registration request is transmitted, or may be executed simultaneously with the advertisement registration request, or may be executed after the advertisement is registered in the server 1 (the process of step S4 described later). Alternatively, in another example embodiment, an advertisement rate may occur in accordance with the fact that the user terminal 2 receives (or reproduces) the advertisement. At this time, the process regarding charging may be executed every time an advertisement rate occurs (that is, every time the advertisement is received or reproduced).

If the process regarding charging is executed, and the payment for the advertisement rate is completed, the server 1 registers the advertisement in accordance with the advertisement registration request (step S4). That is, the server 1 generates advertisement information regarding the advertisement and stores the advertisement information in the storage section 13. Consequently, the transmission of the advertisement included in the advertisement registration request is permitted.

Figure 7:
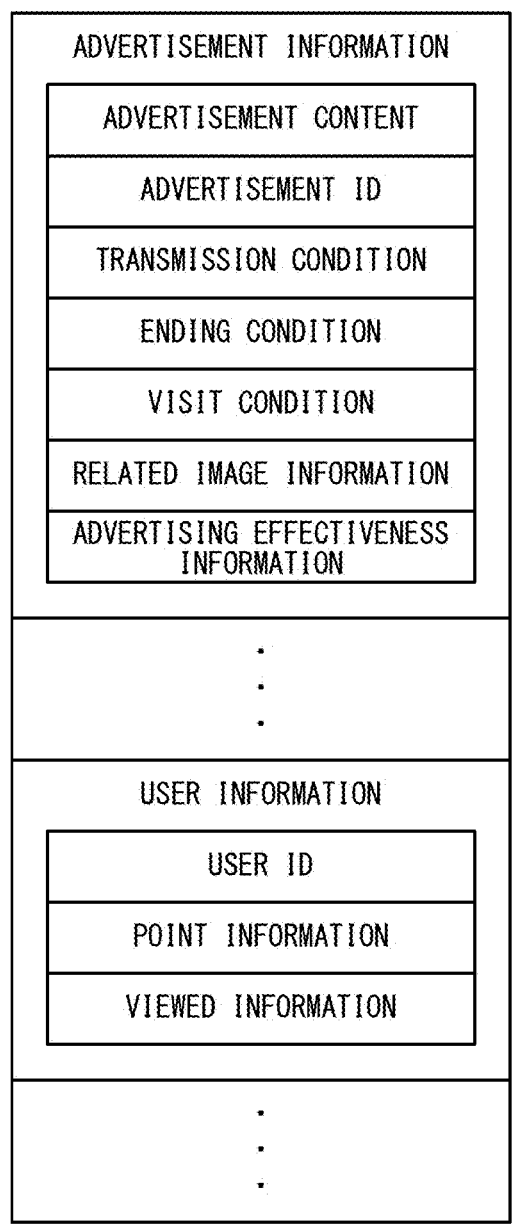
FIG. 7 is a diagram showing a non-limiting example of information stored in the server.

FIG. 7 is a diagram showing an example of information stored in the server 1. As shown in FIG. 7, the server 1 stores advertisement information including a registered advertisement (content) and information associated with the advertisement. In the example embodiment, the advertisement information includes an advertisement ID, a transmission condition, an ending condition, a visit condition, related image information, and advertising effectiveness information.

The advertisement ID included in the advertisement information is identification information that is assigned to each advertisement content and identifies the advertisement content. For example, the advertisement ID is automatically set by the server 1 so as not to have the same value as that of another advertisement.

The transmission condition included in the advertisement information is the transmission condition included in the advertisement registration request. Further, the ending condition included in the advertisement information is the ending condition included in the advertisement registration request. That is, in the example embodiment, regarding the transmission condition and the ending condition, the conditions set by the advertiser are stored in the server 1. It should be noted that in another example embodiment, the transmission condition and/or the ending condition may not be included in the advertisement registration request, and may be set on the server 1 side.

The visit condition is a condition for determining whether or not (for example, after watching the advertisement) the user visits the advertisement place. In the example embodiment, the visit condition is a condition regarding the position of the user terminal 2, and more specifically, is a condition regarding the positional relationship between the user terminal 2 and the advertisement place. For example, the visit condition is that the user terminal 2 stays in a predetermined range with respect to the advertisement place for a predetermined time or more (for example, for 15 minutes or more). Based on such a condition, for example, it is possible to determine whether or not the user actually visits a shop related to the advertisement. Although the details will be described later, in the example embodiment, if the visit condition is satisfied after the user views the advertisement, that is, if the user visits the advertisement place after watching the advertisement, points are further given to the user (step S14 in shown in FIG. 5).

It should be noted that the method for setting (for example, generating) the visit condition is any method. For example, if position information of the advertisement place is stored in advance in the server 1, the server 1 may automatically set the visit condition based on the position information. Further, for example, the administrator of the server 1 may manually input and set the visit condition. Alternatively, in another example embodiment, the advertiser may set the visit condition, and the advertisement provision terminal 3 may transmit an advertisement registration request including the visit condition to the server 1.

The related image information is information indicating a related image to be transmitted to the user terminal 2 having reproduced the advertisement. Here, in the example embodiment, if the user terminal 2 reproduces a certain advertisement, a related image associated with the advertisement is displayed at predetermined timing in the user terminal 2 (for example, the timing when a menu image is displayed, or timing during the execution of a predetermined application) (the details will be described later). The related image is an image related to the advertisement. Specifically, the related image may be an image representing a product related to the advertisement, or an image representing a store, a brand name, or a product name of the advertiser (the details will be described later). The related image information may include data itself of the related image, or may be information identifying the related image. For example, if data of the related image is stored in the user terminal 2 (for example, data of the related image is included in a program stored in the user terminal 2), the related image information may be information indicating an identification number identifying the related image.

It should be noted that the method for generating a related image is any method. For example, related image information may be automatically generated by the server 1 based on an advertisement content included in an advertisement registration request. Further, for example, the administrator of the server 1 may manually input and set related image information. Alternatively, in another example embodiment, the advertiser may generate a related image, and the advertisement provision terminal 3 may transmit an advertisement registration request including related image information to the server 1.

In the example embodiment, the related image information includes program information indicating a program for applying a related image (a program to be executed by the user terminal 2). For example, the related image information indicates an application program (for example, the above advertisement viewing application or a map application described later), or a system program to be executed by the user terminal 2.

The advertising effectiveness information is information indicating the effect of the advertisement (advertising effectiveness). In the example embodiment, the advertising effectiveness information includes information indicating the number of viewing users described above and information indicating the number of times of the reproduction in a gallery described later. Although the details will be described later, the number of viewing users is used to determine the above ending condition. Further, the number of times of the reproduction in the gallery is the number of times the advertisement is reproduced in an advertisement gallery described later, and is used to make a determination regarding the giving of points to the advertiser. It should be noted that the advertising effectiveness information may be any information indicating advertising effectiveness. For example, in another example embodiment, the advertising effectiveness information may be information indicating the number of user terminals 2 having received the advertisement, or may be information indicating the number of users having visited the advertisement place. It should be noted that when advertisement information is generated, the server 1 generates advertising effectiveness information indicating "0" as each of the number of viewing users and the number of times of the reproduction in the gallery.

In the example embodiment, the server 1 acquires an advertisement content, a transmission condition, and an ending condition from an advertisement registration request and generates an advertisement ID, a visit condition, related image information, and advertising effectiveness information, thereby generating advertisement information and storing the advertisement information in the storage section 13. Consequently, the advertisement information corresponding to the advertisement registration request is stored in the server 1, and the advertisement is registered.

(2-3. Process of Transmitting and Reproducing Advertisement Content)

Next, a description is given of an example of the operation in which the advertisement registered in the server 1 is transmitted to and reproduced in the user terminal 2 (steps S5 to S10 shown in FIG. 5).

Figure 8:
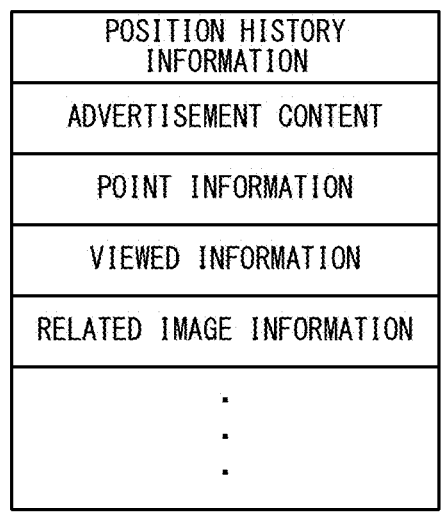
FIG. 8 is a diagram showing a non-limiting example of information stored in the user terminal.

First, with reference to FIGS. 7 and 8, a description is given of various types of information (data) stored in the server 1 and the user terminal 2. As shown in FIG. 7, the server 1 stores user information with respect to each user of the network service.

It should be noted that in the example embodiment, "with respect to each user" includes the meaning "with respect to each account of the network service". That is, in the example embodiment, a single account for the network service is regarded as a single user. Thus, if a plurality of people share a single account, the information processing system regards the plurality of people collectively as a single user. If, on the other hand, a single person has a plurality of accounts, the person is regarded as different users for the respective accounts. It should be noted that in another example embodiment, one or more people using a single user terminal 2 may be regarded as "a single user". That is, "with respect to each user" can include the meaning "with respect to each user terminal 2". In this case, the information processing system treats a single user terminal 2 as a single user. Thus, even if a plurality of people use a single user terminal 2, the information processing system regards the plurality of people collectively as a single user. If, on the other hand, a single person uses a plurality of user terminals 2, the information processing system regards the person as different users for the respective user terminals 2.

As shown in FIG. 7, in the example embodiment, the user information includes a user ID, point information, and viewed information. The user ID is identification information that is assigned to each user and identifies the user. In the example embodiment, the user ID is an ID of an account for the above network service. It should be noted that if a single user terminal 2 is treated as a single user, an identification number (for example, a MAC address or the like) for identifying the user terminal 2 may be used as the user ID. It should be noted that when accessing the server 1, the user terminal 2 transmits the user ID to the server 1. This enables the server 1 to identify the user terminal 2 (the user) accessing the server 1. Further, the server 1 can store various types of information (for example, point information or the like described later) regarding each user (that is, each terminal).

The point information is information indicating the number of points given to the user. Further, the viewed information is information indicating an advertisement viewed by the user. For example, the viewed information indicates a list of advertisement IDs of advertisements viewed by the user, that is, advertisements reproduced in the user terminal 2. It should be noted that the viewed information may include the number of times the user views each advertisement, the date and time when the user views the advertisement, and/or the time in which the user views the advertisement.

FIG. 8 is a diagram showing an example of information stored in the user terminal 2. As shown in FIG. 8, the storage section 23 of the user terminal 2 stores position history information, advertisement content, point information, viewed information, and related image information.

The position history information is information indicating the history of position information detected by the position detection section 24 of the user terminal 2. In the example embodiment, the user terminal 2 successively detects position information while the user is out, and stores information including each piece of detected position information as position history information in the storage section 23.

The advertisement content is content data of an advertisement transmitted from the server 1 to the user terminal 2 and received by the user terminal 2 in a case where a transmission condition is satisfied.

The point information is information indicating the current number of points given to the user. The point information stored in the user terminal 2 has the same information as those of the point information stored in the server 1 and included in the user information regarding the user of the user terminal 2.

The viewed information is information indicating an advertisement viewed by the user. The viewed information stored in the user terminal 2 is the same information as those of the viewed information stored in the server 1 and included in the user information regarding the user of the user terminal.

The related image information is information indicating a related image acquired by the user terminal 2. Similarly to the related image information included in the advertisement information stored in the server 1, the related image information may include data itself of the related image, or may be information identifying the related image. It should be noted that the storage section 23 stores as many pieces of related image information as a number corresponding to the number of related images acquired by the user terminal 2.

Referring back to FIG. 5, the user terminal 2 acquires position history information indicating the history of the position of the user terminal 2 (step S5). In the example embodiment, position information is successively detected, and position history information including each piece of position information successively detected while the user is out is acquired. Specifically, the user terminal 2 stores the position of the user's home in advance and detects position information at predetermined time intervals. Then, if detected position information comes out of a predetermined range with respect to the position of the home, the user terminal 2 determines that the user goes out, and then stores, as position history information, position information detected while the user is out. Further, the user terminal 2 adds successively detected position information to position history information while determining that the user is out. Then, if detected position information enters the predetermined range with respect to the position of the home, the user terminal 2 determines that the user returns home, and then ends the process of adding position information to position history information. In the above manner, a single piece of position history information includes each piece of position information acquired while the user goes out once. Further, in the example embodiment, if the user goes out multiple times, position history information is acquired and stored every time the user goes out.

As described above, in the example embodiment, if the user goes out, the user terminal 2 automatically acquires position history information. Here, the method for acquiring position history information is any method. In another example embodiment, position history information may be acquired by another method. For example, in another example embodiment, the user terminal 2 may successively detect position information while the user terminal 2 is operating, and then store the detected position information as position history information. At this time, if the timing of transmitting the position history information to the server 1 arrives (step S7 described later), the user terminal 2 transmits the position history information including position information detected by the timing to the server 1. Further, for example, the user terminal 2 may start detecting position information (and acquiring position history information) in accordance with the fact that the user gives a predetermined detection start instruction, or may end detecting position information in accordance with the fact that the user gives a predetermined detection ending instruction. For example, the user terminal 2 may start detecting position information (and acquiring position history information) in accordance with the fact that the above advertisement viewing application is started.

Further, in another example embodiment, if the user terminal 2 has the function of performing communication via a mobile communication network, the user terminal 2 may transmit position history information to the server 1 at any timing. For example, the user terminal 2 may transmit position history information to the server 1 in accordance with the fact that the user terminal 2 stays in a predetermined place, or may transmit position history information to the server 1 at predetermined time intervals.

Next, the user terminal 2 starts the advertisement viewing application in accordance with an instruction from the user (step S6). Here, it is assumed that as described above, the user terminal 2 can communicate with the server 1 at the user's home, and the user starts the advertisement viewing application in the state where the user terminal 2 can communicate with the server 1.

If starting the advertisement viewing application, the user terminal 2 transmits the position history information to the server 1 (step S7). That is, if the user terminal 2 is in the state of being capable of communicating with the server 1 during the execution of the advertisement viewing application (for example, if the user stays home), the user terminal 2 transmits the position history information to the server 1. In the example embodiment, information of the user ID of the user of the user terminal 2 is transmitted together with the position history information to the server 1. It should be noted that here, the user ID (an ID of an account for the network service) is input when the advertisement viewing application is started, and the input user ID is transmitted together with the position history information to the server 1. Further, in the process of step S7, the user terminal 2 transmits, to the server 1, position history information that is stored in the user terminal 2 and has not yet been transmitted to the server 1.

If receiving the position history information from the user terminal 2, then based on the position history information, the server 1 identifies an advertisement to be transmitted to the user terminal 2 (step S8). That is, the server 1 determines, with respect to each transmission condition, whether or not the received position history information satisfies each transmission condition included in each piece of advertisement information stored in the server 1. As described above, the transmission condition is a condition regarding the position of the user terminal 2, and for example, is that the user terminal 2 passes through a predetermined range with respect to an advertisement place. At this time, the server 1 determines whether or not part of the trajectory of a position indicated by the position history information is included in the predetermined range.

It should be noted that in another example embodiment, the transmission condition may include another condition in addition to the condition regarding the position. For example, the transmission condition may include the speed of passing through the predetermined range with respect to the advertisement place, the time in which the user terminal 2 stays in the predetermined range, and/or a condition regarding the time zone in which the user terminal 2 passes through the predetermined range (see "(Variation Regarding Transmission Condition)" in "[6. Variations]" described later).

Alternatively, in another example embodiment, the transmission condition is not limited to the condition regarding a single piece of position history information (a condition determined based on a single piece of position history information), and may be a condition regarding a plurality of pieces of position history information (a condition determined based on a plurality of pieces of position history information). That is, the transmission condition may be a condition regarding the number of times, and/or the frequency with which, the user terminal 2 passes through the predetermined range with respect to the advertisement place. For example, the transmission condition may be that the user terminal 2 passes through the predetermined range five times, or that the user terminal 2 passes through the predetermined range three times a week.

If there is a satisfied transmission condition, the server 1 identifies an advertisement corresponding to the transmission condition (an advertisement associated with the transmission condition in the advertisement information) as an advertisement to be transmitted. It should be noted that if there are a plurality of satisfied transmission conditions, a plurality of advertisements to be transmitted are identified. Further, if there is no satisfied transmission condition, an advertisement to be transmitted is not identified.

It should be noted that in the example embodiment, if receiving the position history information from the user terminal 2, the server 1 executes the process of giving points in accordance with the fact that the user visits the advertisement place (step S14), in addition to the process of step S8. This process will be described later.

The server 1 transmits the identified advertisement to the user terminal 2 satisfying the transmission condition (step S9). In the example embodiment, the server 1 transmits information indicating the advertisement ID and the title of the advertisement together with content data of the advertisement to the user terminal 2. It should be noted that although not shown in the figures, if there is no satisfied transmission condition, and an advertisement is not identified, an advertisement is not transmitted to the user terminal 2. At this time, the server 1 may transmit to the user terminal 2 a notification that there is no advertisement to be transmitted. The user terminal 2 receives the advertisement transmitted from the server 1 and stores the advertisement.

As described above, in the example embodiment, if an advertisement is identified, the server 1 transmits the identified advertisement to the user terminal 2. Here, in another example embodiment, if an advertisement is identified, first, the server 1 may transmit outline information of the advertisement (for example, including information of a thumbnail and the title). At this time, the user terminal 2 displays outline information (or may display an image similar to a reproduction list image described later), receives from the user an indication of an advertisement to be viewed, and notifies the server 1 of the advertisement indicated by the user. The server 1 may transmit the advertisement in accordance with this notification. At this time, the advertisement may be reproduced in a streaming manner in the user terminal 2.

Further, during the execution of the advertisement viewing application, the user terminal 2 reproduces the advertisement in accordance with an instruction from the user (step S10). That is, the user terminal 2 reproduces an advertisement selected by the user from advertisements that can be viewed (for example, advertisements for which the transmission conditions are satisfied). In the example embodiment, the user terminal 2 displays a reproduction list image representing a list of advertisements that can be reproduced, and then allows the user to select an advertisement to be reproduced.

Figure 9:
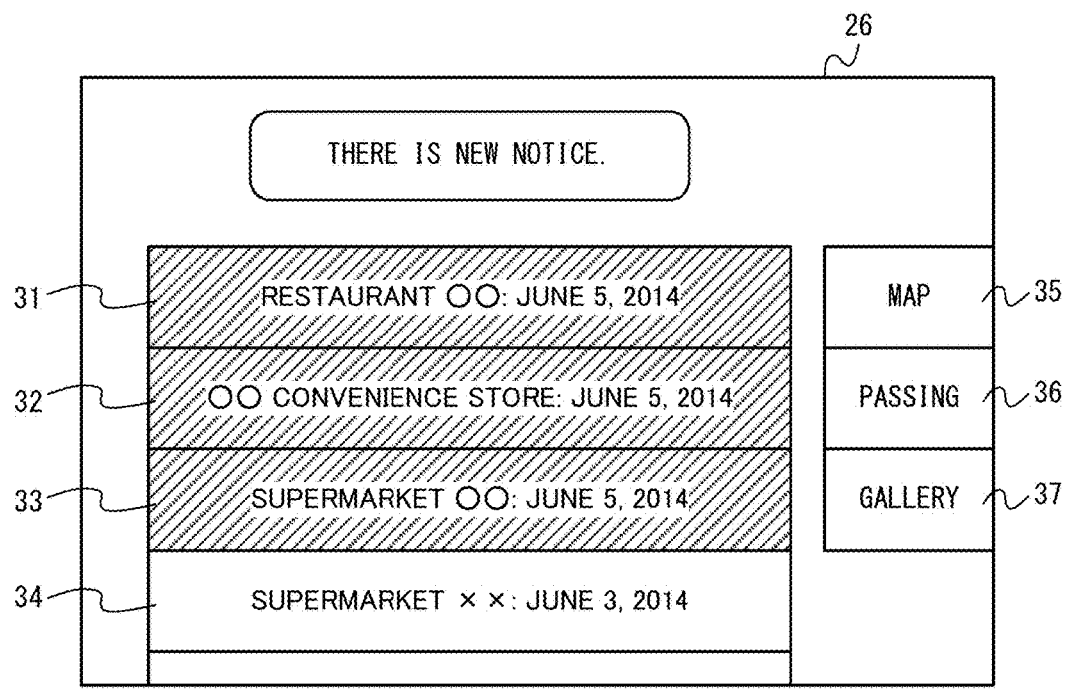
FIG. 9 is a diagram showing non-limiting examples of reproduction list images.

FIG. 9 is a diagram showing an example of the reproduction list image. In the example embodiment, if the advertisement viewing application is started, first, the user terminal 2 displays on the display section 26 the reproduction list image shown in FIG. 9. As shown in FIG. 9, the reproduction list image includes title images representing the titles of advertisements (images 31 to 34 in FIG. 9). In FIG. 9, the title images represent the titles of advertisements and the dates when the advertisements are received. It should be noted that in another example embodiment, the title images may include thumbnail images of the advertisements. Further, in the example embodiment, a title image representing a newly received advertisement (for example, an advertisement received after the advertisement viewing application is previously ended) is displayed in a form different from those of the other advertisements (for example, oblique lines in FIG. 9). This makes it possible to present a newly acquired advertisement in an easily understandable manner.

The above reproduction list image is displayed, thereby notifying the user that a new advertisement is received. It should be noted that in another example embodiment, at timing corresponding to the reception of an advertisement, the user terminal 2 may notify the user that the advertisement is received.

Further, as shown in FIG. 9, the reproduction list image includes a map button 35, a passing button 36, and a gallery button 37. The map button 35 is an image for giving an instruction to display a map. Although the details will be described later, in accordance with the fact that the map button 35 is specified, a map including an advertisement place is displayed (see FIG. 11).

The passing button 36 is an image for giving an instruction to execute a process regarding communication (for example, a passing process) performed with another user terminal while the user is out. Here, the user terminal 2 has the function of automatically communicating with another user terminal, using wireless communication at a short distance (for example, several tens of meters), and can obtain information regarding the user by communication. For example, information regarding the user (for example, profile information) and information of an avatar of the user that are registered in the user terminal 2 are transmitted and received. A specific example of the above passing process is optional. For example, by the passing process, the user can view information regarding another user whom the user passes while the user is out, or can perform a game using an avatar of another user whom the user passes.

The gallery button 37 is an image for giving an instruction to display a list page of advertisements in an advertisement gallery described later. That is, in accordance with the fact that the gallery button 37 is specified, the user terminal 2 displays on the display section 26 a list page of an advertisement gallery (see FIG. 15).

In accordance with the fact that the above title image is specified by the user, the user terminal 2 starts reproducing an advertisement represented by the specified title image. It should be noted that in the example embodiment, the title images in the reproduction list image are displayed in a scrollable manner, and the user terminal 2 scrolls the title images in accordance with a scrolling operation by the user, thereby displaying title images that have not been displayed.

Figure 10:
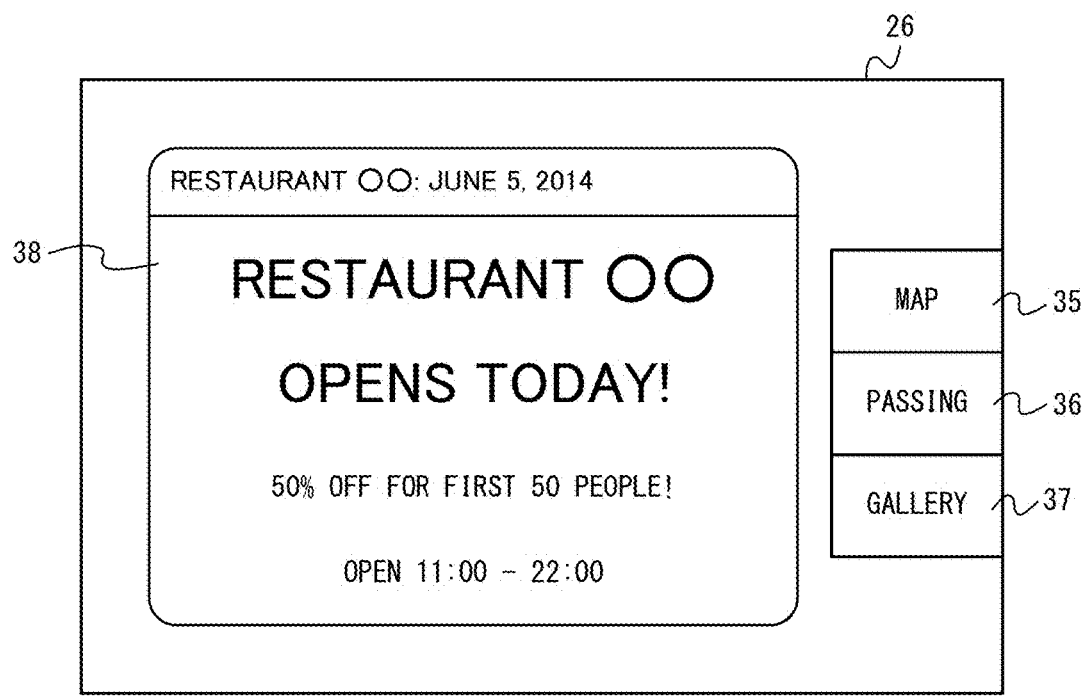
FIG. 10 is a diagram showing a non-limiting example of an image in a case where an advertisement is reproduced.

FIG. 10 is a diagram showing an example of an image in a case where an advertisement is reproduced. FIG. 10 shows an image in a case where in accordance with the fact that the title image 31 shown in FIG. 9 is selected, an advertisement represented by the title image 31 (for example, an advertisement for restaurant ○○) is reproduced. In the example embodiment, as an advertisement content, a moving image 38 is reproduced on the display section 26. It should be noted that the advertisement content may include a sound. At this time, a loudspeaker (not shown) included in the user terminal 2 reproduces the sound.

It should be noted that while the advertisement is reproduced, the user terminal 2 may receive from the user an operation for controlling the reproduction. That is, the user terminal 2 may receive an instruction input for stopping, rewinding, fast-forwarding, and/or the like from the user in the middle of the reproduction of the advertisement, and control the reproduction corresponding to the instruction input.

As described above, in the example embodiment, based on position information (position history information) of the user terminal 2, a transmission condition is determined, and an advertisement corresponding to a satisfied transmission condition is transmitted to the user terminal 2. This enables the information processing system to, for example, provide an advertisement for a user having actually passed near a shop, and provide the user with an appropriate advertisement corresponding to the position of the user.

(2-4. Process of Giving Points Corresponding to Reproduction of Advertisement)

Next, a description is given of an example of the operation of giving points to the user in accordance with the reproduction of the advertisement (steps S11 and S12 shown in FIG. 5). If the reproduction of the advertisement is completed in the process of step S10, the user terminal 2 transmits to the server 1 a viewing notification for notifying the server 1 that the user views the advertisement (step S11). The viewing notification includes the advertisement ID of the reproduced advertisement and the user ID. It should be noted that if it is determined that the user does not (sufficiently) view the advertisement, the user terminal 2 may not transmit the viewing notification. For example, if the advertisement is not reproduced to the end, or if the reproduction time is shorter than a predetermined time, or if the user does not perform a predetermined operation, the user terminal 2 may determine that the user does not view the advertisement. Further, for example, the user terminal 2 may capture the user using a camera, and based on the captured image, determine whether or not the user views the advertisement. For example, if, based on the captured image, it is detected that the user looks away during the reproduction of the advertisement, it may be determined that the user does not view the advertisement.

Further, in the process of step S11, the user terminal 2 updates the viewed information stored in the storage section 23. That is, the advertisement ID of the reproduced advertisement is added to the list indicated by the viewed information (the list of advertisement IDs). It should be noted that if the advertisement ID of the reproduced advertisement is already included in the above list of advertisement IDs, the advertisement ID is not added.

If receiving the viewing notification from the user terminal 2, the server 1 gives points to the user of the user terminal 2 (step S12). That is, the server 1 identifies the user using the user ID included in the viewing notification and updates the point information included in the user information regarding the identified user in the user information stored in the storage section 13. The point information is updated by, for example, adding a predetermined number of points every time a viewing notification is received. Consequently, points corresponding to the number of advertisements viewed by the user are given. It should be noted that the method for giving points may be any method. For example, in another example embodiment, the number of points to be added may be set for each advertisement, and points of a number corresponding to reproduced advertisements may be added.

Further, in the example embodiment, the server 1 transmits to the user terminal 2 a notification including information of the number of given points. Receiving this notification, the user terminal 2 updates the point information stored in the storage section 23, so as to be the same as the number of points indicated by the point information stored in the server 1.

As described above, in the example embodiment, in accordance with the fact that a user views an advertisement, a privilege (for example, points in the network service) is given to the user. This makes it possible to provide a user with a motivation to watch an advertisement provided by the server 1. This can increase advertising effectiveness.

(2-5. Related Image Giving Process Corresponding to Reproduction of Advertisement)

Next, a description is given of an example of the operation of giving a related image to the user in accordance with the reproduction of the advertisement (step S13 shown in FIG. 5). If receiving the viewing notification from the user terminal 2, the server 1 transmits, to the user terminal 2, related image information corresponding to the advertisement related to the viewing notification (step S13). Specifically, the server 1 transmits, in the advertisement information stored in the storage section 13, the related image information included in the advertisement information of the advertisement indicated by the advertisement ID included in the viewing notification, to the user terminal 2.

Receiving the related image information from the server 1, the user terminal 2 stores the received related image information in the storage section 23. This enables the user terminal 2 to display the related image represented by the received related image information. The related image thus given to the user terminal 2 (user) is displayed on the user terminal 2 in an appropriate situation. In the example embodiment, the related image is displayed in a predetermined application, or the related image is displayed in a menu screen.

Figure 11:
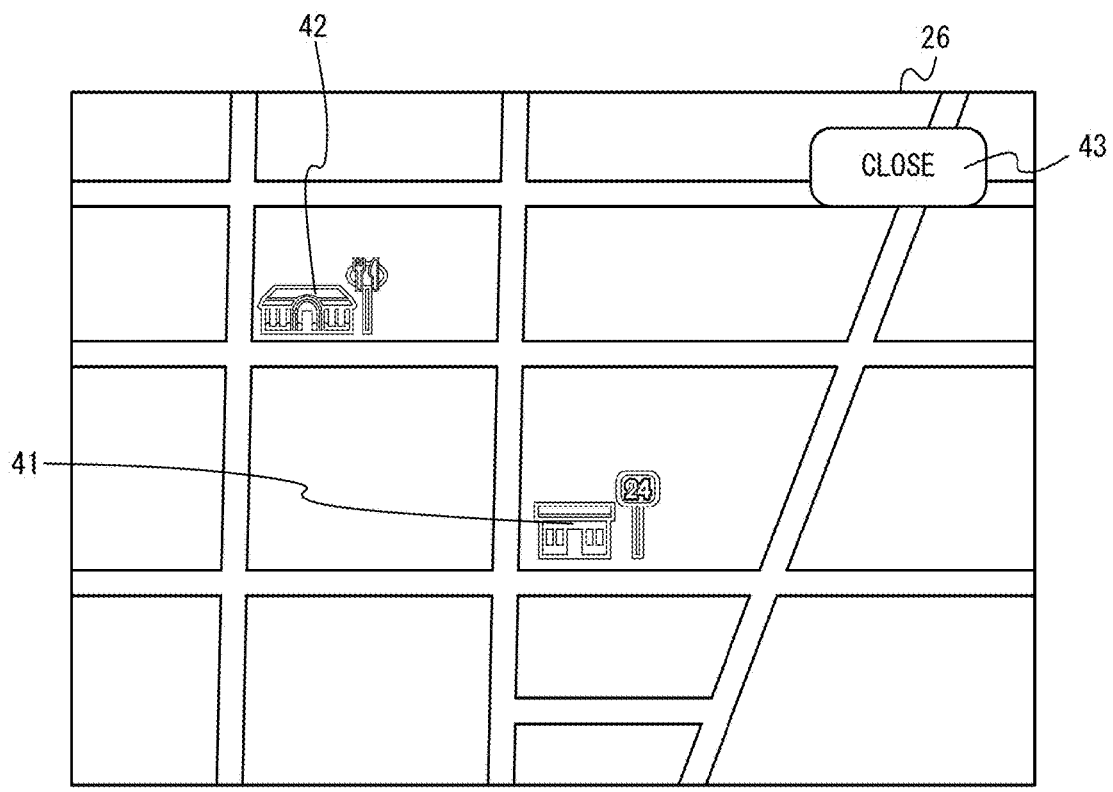
FIG. 11 is a diagram showing a non-limiting example where related images are displayed on a map.

A description is given below of a specific example of the related image displayed in the user terminal 2. FIG. 11 is a diagram showing an example where related images are displayed on a map. Here, in the example embodiment, the user terminal 2 stores a map application program (a map application) for displaying a map. That is, if the user specifies the map button 35 in the above reproduction list image, the user terminal 2 starts the map application and displays on the display section 26 an image of a map as shown in FIG. 11, for example. It should be noted that in the example embodiment, it is assumed that the map application is started during the execution of the advertisement application. Alternatively, in another example embodiment, the map application may be able to be started separately from the advertisement application (that is, able to be started independently of the advertisement application).

On the map displayed in FIG. 11, shop icons 41 and 42 are displayed as related images. The shop icons 41 and 42 represent stores corresponding to an advertisement reproduced in the user terminal 2 and are displayed at positions corresponding to advertisement places on the map. It should be noted that to display as a related image an icon to be displayed on the map, the server 1 transmits, as related image information, information indicating an image of the icon and the position on the map. When displaying the map, the user terminal 2 references the related image information stored in the storage section 23 and displays on the map the icon indicated by the related image information.

It should be noted that in FIG. 11, a map ending button 43, which is displayed together with the map, is an image for giving an instruction to end the display of the map (the execution of the map application) and display a reproduction list image.

Figure 12:
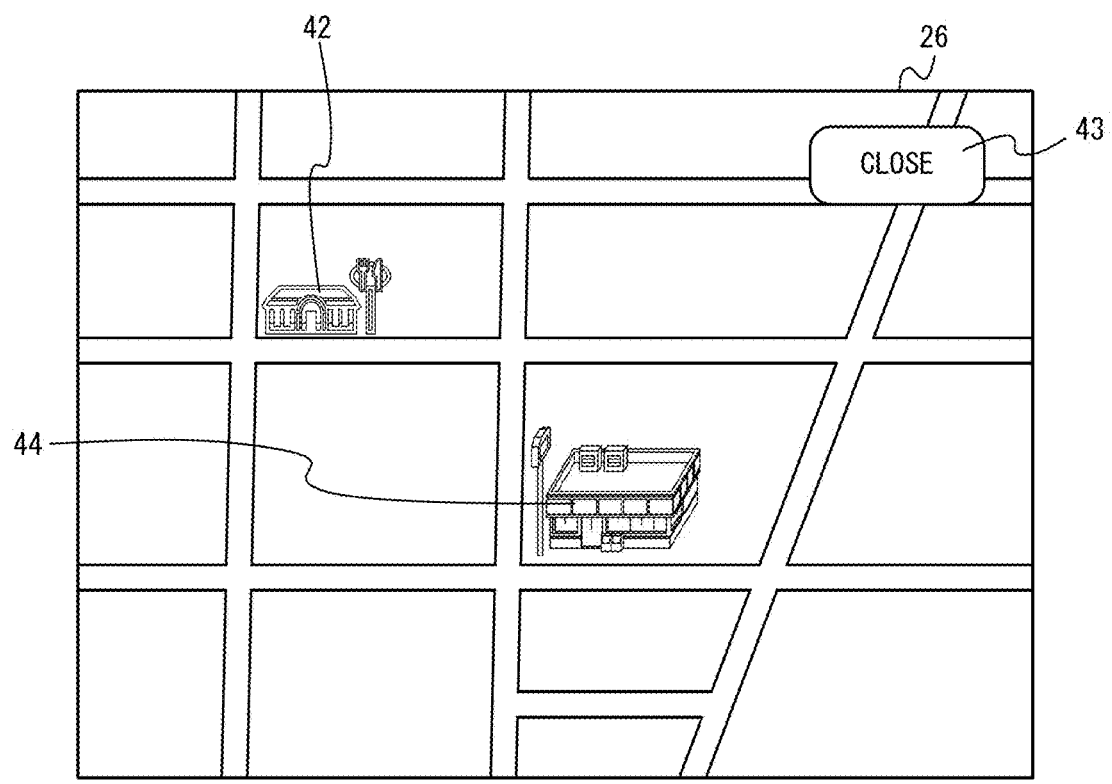
FIG. 12 is a diagram showing a non-limiting example of a case where a related image is changed.

It should be noted that in another example embodiment, a related image may be changed in accordance with the state of viewing the advertisement (for example, the number of times of the viewing of the advertisement), and/or the state of visiting the advertisement place (for example, the state of the satisfaction of a transmission condition, or the state of the satisfaction of a visit condition). FIG. 12 is a diagram showing an example of the case where a related image is changed. In FIG. 12, the icon 41, which is in a planer display form as an image on the map shown in FIG. 11, is changed to an icon 44 in a three-dimensional display form. Alternatively, in another example embodiment, as a related image after the change, an avatar of the advertiser may be additionally displayed in addition to the shop icon. As described above, a related image may be changed in accordance with the fact that a condition regarding the state of viewing an advertisement and/or the state of visiting an advertisement place is satisfied.

For example, the information processing system may store the number of times the advertisement is reproduced (for example, viewed), and may change a related image in accordance with the number of times of the reproduction. Specifically, if the number of times a certain advertisement is reproduced reaches a predetermined number of times or more, the icon 41, which is a related image regarding the advertisement, may be changed to the icon 44. Further, for example, the information processing system may store the number of times of the satisfaction of the described above transmission condition (or visit condition) with respect to each user terminal 2 (each user), and may change a related image in accordance with the number of times of the satisfaction. Specifically, if the number of times a certain advertisement satisfies the transmission condition reaches a predetermined number of times or more, the icon 41, which is a related image regarding the advertisement, may be changed to the icon 44. Further, for example, the information processing system may change a related image in accordance with the fact that the above visit condition is satisfied.

Alternatively, in another example embodiment, related image information may be, in accordance with the fact that the transmission condition for an advertisement associated with the related image information is satisfied, transmitted from the server 1 to the user terminal 2 so that a related image can be displayed on the user terminal 2. Further, at this time, in accordance with the fact that a visit condition is satisfied after a transmission condition is satisfied regarding a certain advertisement, the display form of a related image of the advertisement transmitted in accordance with the satisfaction of the transmission condition may be changed.

To change a related image, in accordance with the fact that a condition for changing the related image is satisfied, the server 1 transmits, to the user terminal 2, related image information indicating the related image after the change. Receiving this related image information, the user terminal 2 stores the related image information indicating the related image after the change, instead of related image information indicating the related image before the change. Consequently, the related image after the change is displayed.

It should be noted that the map displayed on the user terminal 2 does not need to be a map corresponding to the real world, and may be a map representing a virtual world. For example, in a map representing a game world, a shop icon may be added as a related image. Further, the map may be a map where a place frequented by the user is deformed (for example, a map where the range frequented by the user is relatively wide, and another place is relatively narrow).

Figure 13:
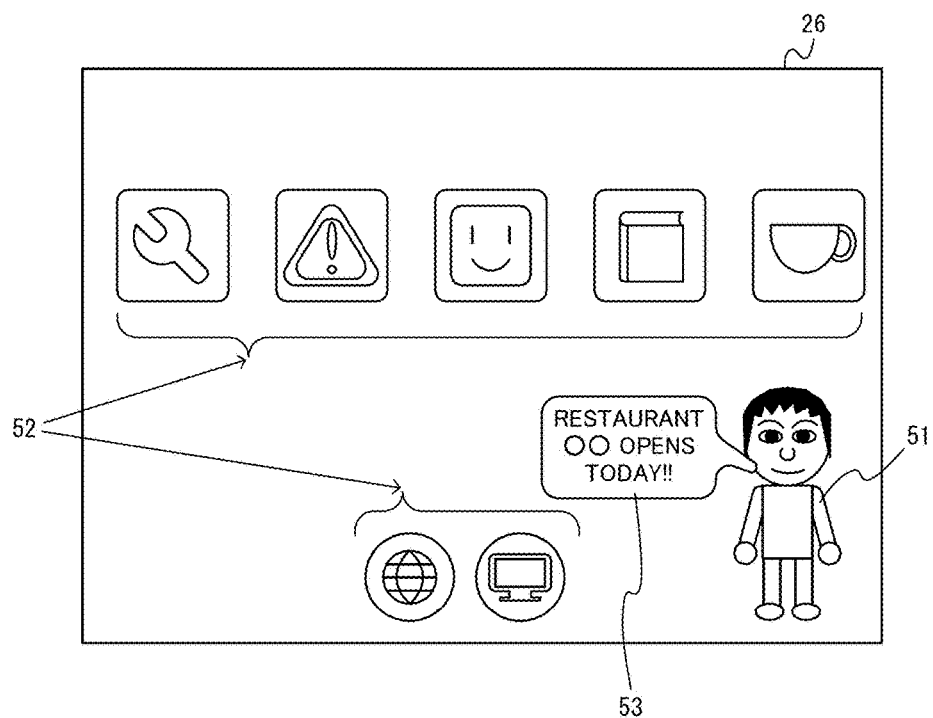
FIG. 13 is a diagram showing a non-limiting example where related images are displayed on a menu screen.

FIG. 13 is a diagram showing an example where related images are displayed on a menu screen. In the example embodiment, the user terminal 2 starts and executes various applications including the above advertisement viewing application in accordance with a start instruction from the user. The user terminal 2 displays on the display section 26 a menu image for giving the above start instruction. In the example embodiment, as well as a case where an image by the execution of an application is displayed (for example, the above map image), a related image may be displayed also in this menu image.

As shown in FIG. 13, as menu images, icons 52 for starting applications and an avatar 51 are displayed. Each icon 52 represents an application that can be executed by the user terminal 2. If the user specifies an icon, the user terminal 2 starts the application corresponding to the specified icon. Further, the avatar 51 is an avatar of the user created in advance and registered in the user terminal 2. The avatar 51 is, for example, used for a help function (for example, if the user specifies the avatar 51, a help menu is displayed, or the description of help is displayed), and used to notify the user of a notice in the network service. It should be noted that in another example embodiment, the method for using the avatar 51 is any method. Alternatively, the avatar 51 may not be displayed.

In the example embodiment, when a menu image is displayed, a related image is displayed in association with the avatar 51. In the example of FIG. 13, as a related image, a balloon image 53 of the avatar 51 including words regarding the advertisement (for example, "Restaurant ○○ opens today!!" in FIG. 13) is displayed. Specifically, to display a menu image, the user terminal 2 selects one of related images stored in the storage section 23 and displays the selected related image. It should be noted that the method for selecting a related image is any method. For example, the user terminal 2 may store information indicating whether or not a related image stored in the storage section 23 has been displayed, and may randomly select one of related images that have not been displayed. Further, for example, the latest one (the last received one) of related images that have not been displayed may be selected. In the example embodiment, a single related image is displayed in a menu image. Alternatively, in another example embodiment, a plurality of related images may be simultaneously displayed.

Further, a specific example of a related image to be displayed in a menu image is optional. For example, a related image may be a background image in a menu image, or may be an image of an icon. For example, as the background image, an image including a logotype or a character of the company of the advertiser may be displayed, or the color of an icon may be changed to a color (an image color) suitable for a product of the advertisement or the company of the advertiser.

In the example embodiment, a related image is associated with each advertisement. Thus, a related image is changed in accordance with the type of a reproduced advertisement. Further, in the example embodiment, if related image information of a related image that can be displayed in a menu image is not stored in the user terminal 2, the related image is not displayed. Thus, in the example embodiment, it can be said that in accordance with the number of times an advertisement is reproduced, the display of an avatar (or a menu image) is changed.

Further, a related image may be displayed in another application that is executed by the user terminal 2 and is other than the advertisement viewing application and the map application. For example, in a game application, an item regarding a product of an advertisement reproduced in the user terminal 2 (an item of the same type as the product) may be given to a player character and displayed as a related image. Specifically, for example, if the product is food, an item of food may be given to the player character. Alternatively, for example, in accordance with the fact that an advertisement is reproduced in the user terminal 2, the display form of a player character in a game application may be changed to a form corresponding to a product of the advertisement. Specifically, for example, if the product is clothes, the clothes of the player character may be changed to clothes corresponding to the product (in this case, the related image is the clothes of the player character). Yet alternatively, for example, under the condition that a predetermined advertisement is reproduced, the user terminal 2 may advance a game in a game application. Specifically, under the condition that a predetermined advertisement is reproduced, a new game stage becomes able to be played, or the story of a game may be advanced.

As described above, in the example embodiment, in accordance with the fact that a user views an advertisement, a related image related to the advertisement is given to the user. According to this, the related image can remind the user of the advertisement and information regarding the advertisement (for example, a product, an advertiser, or the like). This can further increase advertising effectiveness. Further, if the user terminal 2 displays a related image at the timing when an advertisement is not displayed, information regarding the advertisement can be presented to the user on more opportunities. Further, a related image can be said to be a privilege to be given to a user for viewing an advertisement. Thus, a related image is given as a privilege in accordance with the viewing of an advertisement, whereby it is possible to provide a user with a motivation to view the advertisement. This can increase advertising effectiveness.

(2-6. Process of Giving Points Corresponding to Visit to Advertisement Place)

Next, a description is given of the process of giving points to the user having actually visited an advertisement place (step S14 shown in FIG. 5). If receiving the above position history information from the user terminal 2, the server 1 gives points to the user in accordance with the fact that the user visits an advertisement place regarding the advertisement reproduced in the user terminal 2 (step S14).

In the above step S14, first, the server 1 identifies an advertisement reproduced in the user terminal 2. That is, the server 1 identifies a user based on the user ID received together with the position history information from the user terminal 2 and references the viewed information included in the user information of the identified user, thereby identifying an advertisement reproduced in the user terminal 2. Next, the server 1 determines whether or not the visit condition for the reproduced advertisement is satisfied. That is, with respect to each visit condition, the server 1 determines, based on the position history information received from the user terminal 2, whether or not the visit condition included in the advertisement information regarding the reproduced advertisement is satisfied. As described above, the visit condition is a condition regarding the position of the user terminal 2 and is that, for example, the user terminal 2 stays in a predetermined range with respect to an advertisement place for a predetermined time or more. At this time, the server 1 determines whether or not part of the trajectory of a position indicated by the position history information is included in the predetermined range for the predetermined time or more.

It should be noted that regarding a single advertisement, an advertisement place set in the transmission condition and an advertisement place set in the visit condition may not be the same. For example, regarding a certain advertisement, the position of an advertisement place set in the transmission condition may be the position of the closest station to the store of the advertiser, and the position of an advertisement place set in the visit condition may be the position of the store of the advertiser.

Alternatively, in another example embodiment, the visit condition may include another condition in addition to the condition regarding the position. For example, the visit condition may include conditions regarding the speed of passing through the predetermined range with respect to the advertisement place and/or the time zone in which the user terminal 2 passes through the predetermined range.

Alternatively, in another example embodiment, the visit condition is not limited to the condition regarding a single piece of position history information (a condition determined based on a single piece of position history information), and may be a condition regarding a plurality of pieces of position history information (a condition determined based on a plurality of pieces of position history information). That is, the visit condition may be a condition regarding the number of times, and/or the frequency with which, the user terminal 2 passes through the predetermined range with respect to the advertisement place. For example, the visit condition may be that the user terminal 2 passes through the predetermined range five times, or that the user terminal 2 passes through the predetermined range three times a week.

If there is a satisfied visit condition, the server 1 gives points to the user of the user terminal 2 having transmitted the position history information. That is, the server 1 updates the point information included in the user information regarding the user identified by the user ID received together with the position history information from the user terminal 2. The point information is updated by, for example, adding a predetermined number of points every time the visit condition is satisfied. Consequently, points corresponding to the number of times the user actually visits the advertisement place are given. It should be noted that the method for giving points may be any method. For example, in another example embodiment, the number of points to be added may be set for each advertisement, and points of a number corresponding to an advertisement corresponding to a visited advertisement place may be added.

It should be noted that if there is no satisfied visit condition, the server 1 does not give points to the user. Further, also in the process of step S14, similarly to the process of step S12, the server 1 transmits to the user terminal 2 a notification including information of the number of given points. Receiving this notification, the user terminal 2 updates the point information stored in the storage section 23, so as to be the same as the number of points indicated by the point information stored in the server 1.

As described above, in the example embodiment, in accordance with the fact that a user visits an advertisement place, a privilege (for example, points in the network service) is given to the user. This makes it possible to provide a user with a motivation to visit an advertisement place regarding an advertisement, and therefore increase the attracting effect of the advertisement. This can further increase advertising effectiveness.

(2-7. Process of Ending Transmission of Advertisement)

Next, a description is given of an example of the operation of ending the transmission of the advertisement registered in the server 1 (steps S15 to S18 shown in FIG. 5). In the example embodiment, if the number of users having viewed an advertisement (the number of viewing users) reaches a predetermined number, the registration of the advertisement is deleted. Further, the transmission of an advertisement corresponding to the satisfaction of the transmission condition is ended (or prohibited).

Specifically, if receiving the above viewing notification from the user terminal 2, the server 1 updates advertisement information and user information related to the viewing notification, where necessary (step S15). That is, the server 1 updates the viewed information included in the user information corresponding to the user ID included in the viewing notification and the advertising effectiveness information included in the advertisement information corresponding to the advertisement ID included in the viewing notification, where necessary.

The viewed information is updated similarly to the process of updating the viewed information by the user terminal 2 (step S11). That is, the advertisement ID included in the viewing notification is added to the list indicated by the viewed information (the list of advertisement IDs). If, however, the advertisement ID is already included in the above list of advertisement IDs, the advertisement ID is not added.

Further, in the advertising effectiveness information, the value of the number of viewing users is updated, where necessary. That is, the server 1 determines whether or not the advertisement is reproduced for the first time in the user terminal 2 having transmitted the viewing notification. If the advertisement is reproduced for the first time, the number of viewing users is increased by 1. If, on the other hand, the advertisement is reproduced not for the first time, the server 1 does not update the number of viewing users. It should be noted that this determination can be made based on whether or not in the process of updating the viewed information, the advertisement ID is added to the list of advertisement IDs indicated by the viewed information.

Next, the server 1 determines whether or not the ending condition for the advertisement related to the viewing notification is satisfied (step S16). That is, the server 1 determines whether or not the ending condition included in the advertisement information regarding the advertisement of the advertisement ID included in the viewing notification is satisfied. In the example embodiment, the ending condition is a condition regarding the number of viewing users described above. Thus, the above determination is made based on the number of viewing users indicated by the advertising effectiveness information included in the advertisement information. For example, the server 1 determines whether or not the number of viewing users indicated by the advertising effectiveness information reaches a predetermined number determined in advance in the ending condition.

If it is determined that the ending condition is satisfied, the server 1 executes the process of ending the registration of the advertisement. That is, the server 1 deletes from the storage section 13 the advertisement information of the advertisement for which the ending condition is satisfied (step S17). After this, the server 1 does not determine the transmission condition regarding the advertisement, and the advertisement is not to be transmitted to the user terminal 2. It should be noted that in step S17, instead of deleting the advertisement information, the server 1 may store, in the storage section 13, information indicating that the advertisement information is not registered (the advertisement is not to be transmitted). At this time, the server 1 may make the advertisement of which the registration is ended viewable in an advertisement gallery described later.

Further, the server 1 transmits, to the advertisement provision terminal 3 as the transmission source of the advertisement, an advertisement ending notification indicating that the registration of the advertisement is ended (step S18).

It should be noted that in the example embodiment, the ending condition is a condition regarding the number of viewing users, and therefore, the server 1 determines the ending condition in accordance with the fact that a viewing notification is received. Alternatively, in another example embodiment, the timing of determining the ending condition is any timing, and is not limited to timing corresponding to the reception of a viewing notification. For example, in another example embodiment, if the ending condition is a condition regarding the number of user terminals 2 to which the advertisement is transmitted, the ending condition may be determined at timing corresponding to the transmission of the advertisement to the user terminal 2. Yet alternatively, for example, if the ending condition is a condition regarding the number of users having actually visited the advertisement place, the ending condition may be determined at timing corresponding to the fact that the server 1 receives position history information. Yet alternatively, for example, if the ending condition is a condition regarding the period in which the advertisement is registered, the ending condition may be repeatedly determined every predetermined time.

As described above, in the example embodiment, if the ending condition is satisfied, the registration of the advertisement is canceled. This enables the server 1 to reduce registered advertisements, and therefore to reduce the load of the process of determining the transmission condition for each advertisement. Further, if data of the advertisement of which the registration is canceled is deleted from the server 1, it is possible to reduce the amount of data stored in the server 1. Further, according to the example embodiment, the registration of the advertisement is maintained until the ending condition is satisfied, that is, until certain advertising effectiveness is obtained (for example, until the number of viewing users reaches a predetermined number). Thus, the advertiser can expect advertising effectiveness corresponding to the advertisement rate.

(2-8. Process of Providing Gallery of Advertisements)

Figure 14:
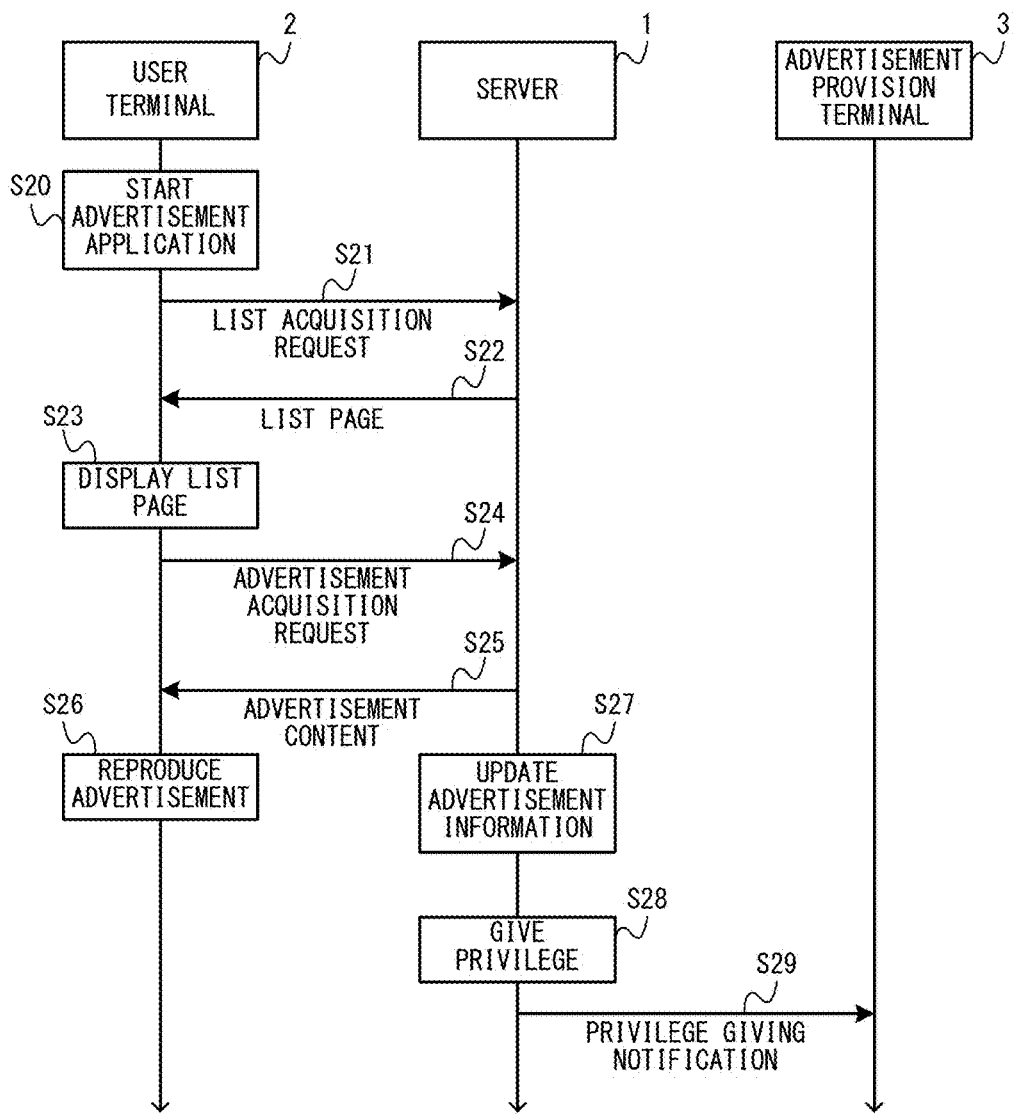
FIG. 14 is a diagram showing a non-limiting example of the flow of the process in a case where an advertisement is reproduced in an advertisement gallery.
Figure 15:
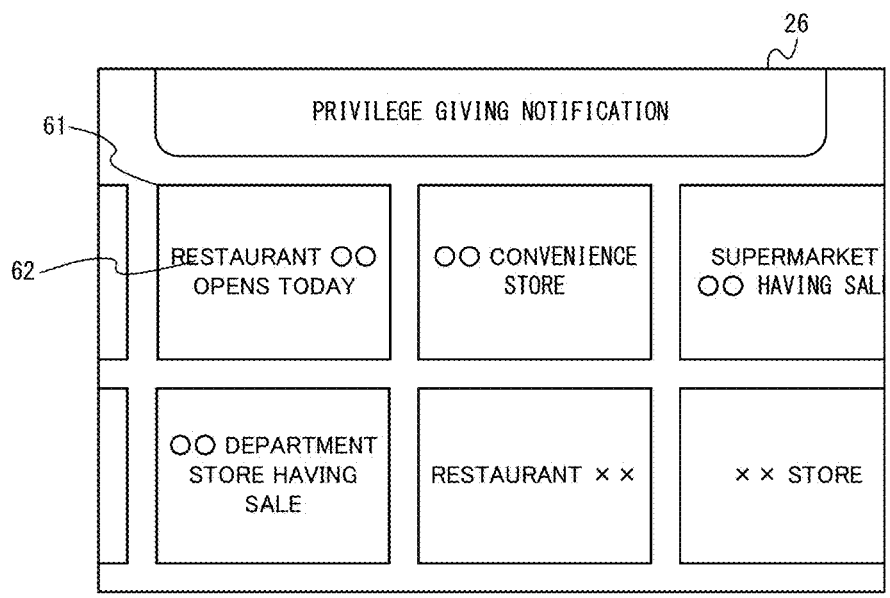
FIG. 15 is a diagram showing a non-limiting example of a list page in the advertisement gallery displayed on the user terminal.

Next, a description is given of the process of providing a gallery of advertisements registered in the server 1. In the example embodiment, in addition to a service for providing an advertisement for the user terminal 2 in accordance with the satisfaction of a transmission condition, the server 1 presents each registered advertisement as an advertisement gallery and performs a service for reproducing an advertisement selected by the user from the presented advertisements. With reference to FIGS. 14 and 15, a description is given below of the process for a service for providing an advertisement in the advertisement gallery.

FIG. 14 is a diagram showing an example of the flow of the process in a case where an advertisement is reproduced in the advertisement gallery. Referring to FIG. 14, first, in accordance with an instruction from the user, the user terminal 2 starts the advertisement viewing application (step S20). Next, in accordance with an instruction from the user, the user terminal 2 transmits to the server 1 a list acquisition request for requesting a list page of the advertisement gallery (step S21). That is, in accordance with the fact that the user performs the operation of specifying the gallery button 37 in the above reproduction list image, the user terminal 2 transmits the above list acquisition request to the server 1.

If receiving the list acquisition request from the user terminal 2, the server 1 transmits the list page of the advertisement gallery to the user terminal 2 (step S22). In the example embodiment, the list page includes outline information of a plurality of advertisements, which are all or some of advertisements stored in the server 1. It should be noted that a specific example of the outline information is optional. In the example embodiment, the outline information includes the titles and thumbnail images of the advertisements. That is, the server 1 generates an image of the above list page using the advertisement information stored in the storage section 13 and transmits the images to the user terminal 2 having transmitted the list acquisition request.

It should be noted that the method for selecting an advertisement (of which outline information is) to be included in the list page is any method. The server 1 may select a predetermined number of advertisements, for example, in order of being newly registered, or in order of popularity in the advertisement gallery (in order of the number of times of the reproduction in the gallery described above). Further, for example, the server 1 may store the resident area of the user as user information and select an advertisement based on the resident area of the user of the user terminal 2 having transmitted the list acquisition request and an advertisement place. Specifically, the server 1 may select an advertisement corresponding to an advertisement place included in the resident area of the user.

Alternatively, the server 1 may select an advertisement based on the user's taste, or may select an advertisement based on the type of product set in advance by the user. Further, advertisements to be included in the list page may be advertisements for which the ending conditions are satisfied (that is, advertisements of which the registration is canceled regarding the transmission corresponding to the transmission conditions).

Receiving the list page from the server 1, the user terminal 2 displays the list page on the display section 26 (step S23). FIG. 15 is a diagram showing an example of the list page of the advertisement gallery displayed on the user terminal 2. In the example embodiment, as shown in FIG. 15, as the list page, an image of outline information of each of a plurality of advertisements is displayed. Specifically, the image of outline information includes a thumbnail image (FIG. 15 shows only a display frame 61 of a thumbnail image, and does not show a specific image) and a title 62. It should be noted that in FIG. 15, the list page is displayed in a scrollable manner, and the user terminal 2 scrolls the list page (for example, to the left and right) in accordance with a scrolling operation of the user, thereby displaying outline information of advertisements that have not been displayed.

In the state where the list page is displayed on the user terminal 2, the user performs the operation of specifying an image of outline information of which the advertisement is to be viewed. In accordance with the fact that the user specifies an image of outline information, the user terminal 2 transmits to the server 1 an advertisement acquisition request for acquiring the advertisement represented by the outline information (step S24). The advertisement acquisition request includes information of the user ID of the user of the user terminal 2 and the advertisement ID of the specified advertisement.

Receiving the advertisement acquisition request from the user terminal 2, the server 1 transmits the advertisement related to the advertisement acquisition request to the user terminal 2 (step S25). That is, the server 1 transmits, in the registered advertisements, the advertisement indicated by the advertisement ID included in the advertisement acquisition request, to the user terminal 2 of the user indicated by the user ID included in the advertisement acquisition request. Receiving the advertisement from the server 1, the user terminal 2 reproduces the received advertisement (step S26). It should be noted that the reproduction of the advertisement in the processes of steps S25 and S26 may be a method in which data of the advertisement content is downloaded to and reproduced in the user terminal 2, or may be a method by streaming reproduction.

Further, if transmitting the advertisement to the user terminal 2, the server 1 updates the advertisement information regarding the transmitted advertisement (step S27). Specifically, the server 1 updates the number of times of the reproduction in the gallery indicated by the advertising effectiveness information included in the advertisement information. Here, the number of times of the reproduction in the gallery is updated to a value obtained by increasing the number of times by 1. It should be noted that if the advertisement is reproduced in the user terminal 2 for the first time, the server 1 may update the number of times of the reproduction in the gallery to a value obtained by increasing the number of times by 1. If the advertisement is reproduced in the user terminal 2 for the second time or thereafter, the server 1 may not update the number of times of the reproduction in the gallery. Although the details will be described later, in the example embodiment, a privilege (for example, points) is given to the advertiser in accordance with the number of times of the reproduction in the gallery. Thus, this is to prevent the advertiser from dishonestly obtaining a privilege by reproducing an advertisement in the advertisement gallery themselves. Alternatively, in another example embodiment, also if the user terminal 2 reproduces an advertisement in the advertisement gallery, the server 1 may give points to the user of the user terminal 2, similarly to the above case where an advertisement is reproduced from the reproduction list image.

If the advertising effectiveness information is updated in the above step S27, the server 1 gives a privilege to the advertiser, where necessary, based on the advertising effectiveness information (step S28). That is, in this case, the server 1 gives points corresponding to the number of times of the reproduction in the gallery indicated by the advertising effectiveness information. For example, the points of the advertiser may be increased by a predetermined number every time the number of times of the reproduction in the gallery increases by a predetermined number of times. It should be noted that the server 1 also stores user information of the advertiser similarly to the user of the user terminal 2. To give points to the advertiser, the server 1 updates the point information included in the user information of the advertiser.

It should be noted that the points given to the advertiser may be points that can be used in the above network service, similarly to the points given to the user of the user terminal 2. Further, the points given to the advertiser may be able to be used to discount the advertisement rate. Further, the fact that the user views an advertisement is already advantageous for the advertiser. Thus, in another example embodiment, in step S28, the server 1 may not give a privilege to the advertiser.

Further, if a privilege (for example, points) is given to the advertiser, the server 1 transmits to the advertisement provision terminal 3 a notification that a privilege is given (including information of the number of given points) (step S29). Receiving this notification, the advertisement provision terminal 3 updates the point information stored in the storage section of the advertisement provision terminal 3, so as to be the same as the number of points indicated by the point information stored in the server 1.

It should be noted that in the example embodiment, an advertisement that can be viewed in the advertisement gallery is the same as an advertisement that can be transmitted to the user terminal 2 if the transmission condition is satisfied. Alternatively, in another example embodiment, an advertisement that can be viewed in the advertisement gallery and an advertisement that can be transmitted to the user terminal 2 if the transmission condition is satisfied may be different from each other. That is, the server 1 may separately register an advertisement of a first type that can be transmitted to the user terminal 2 if the transmission condition is satisfied, and an advertisement of a second type that can be viewed in the advertisement gallery. At this time, the advertisement rate for the advertisement of the second type may be free or lower than the advertisement rate of the advertisement of the first type.

It should be noted that in the example embodiment, the ending condition is unrelated to the number of times of the reproduction in the gallery. That is, even if an advertisement is reproduced in the advertisement gallery, the ending condition is not satisfied. Thus, in the example embodiment, it is possible to certainly provide an advertisement as many times as the number of users having viewed the advertisement by satisfying the transmission condition (advertisement target users). Further, in this case, it can also be said that the advertisement rate regarding an advertisement to be provided for the user in the advertisement gallery is free.

As described above, in the example embodiment, the server 1 transmits, in the registered advertisements, an advertisement for which the transmission condition is satisfied, to the user terminal 2 by push transmission (that is, without an instruction from the user). Further, in the example embodiment, the server 1 transmits, in the registered advertisements, an advertisement indicated by the user in the advertisement gallery, to the user terminal 2. The user cannot view an advertisement unless the transmission condition is satisfied in the above push transmission, whereas the user can view an advertisement specified by the user themselves in the advertisement gallery. Further, it is considered that to increase the number of times of the reproduction in the advertisement gallery, the advertiser focuses on creating an attractive advertisement. Thus, the advertisement gallery improves the quality (attraction) of an advertisement. This enables the provider of the network service to provide an attractive content for the user and therefore increase service members. Thus, according to the example embodiment, it is possible to achieve an advertisement provision system advantageous for all of a user, an advertiser, and a service provider.

3. Processing by Server

Figure 16:
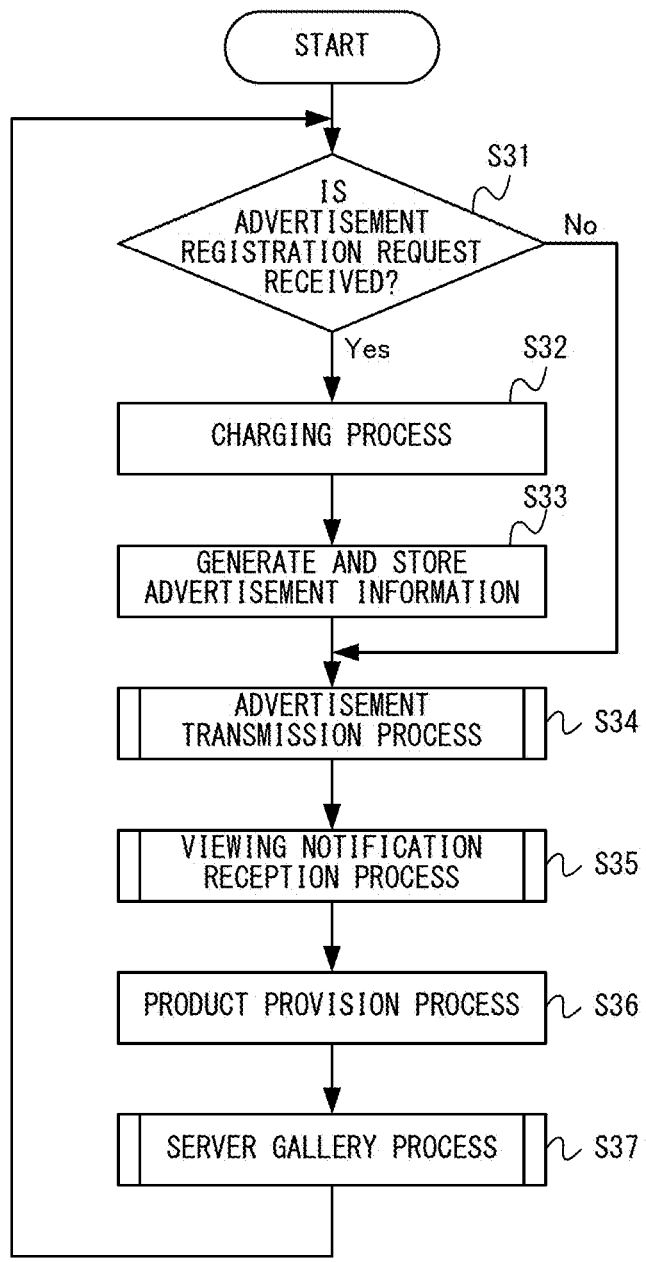
FIG. 16 is a flow chart showing a non-limiting example of the flow of the processing executed by the server.

Next, a description is given of a specific example of the processing executed by the server 1. FIG. 16 is a flow chart showing an example of the flow of the processing executed by the server. A series of processes shown in FIG. 16 is repeatedly executed during the operation of the server 1. Further, if the server 1 is composed of a plurality of information processing apparatuses, each process shown in FIG. 16 may be executed by the cooperation of the plurality of information processing apparatuses.

It should be noted that in the present application, the processes of all the steps in the flow charts shown in the drawings are merely illustrative. Thus, the processing order of the steps may be changed, or another process may be performed in addition to (or instead of) the processes of all the steps, so long as similar results are obtained. Further, in the present specification, a description is given on the assumption that the CPU (the processing section) of each apparatus (the server 1 or the user terminal 2) performs the processes of all the steps in the flow charts. Alternatively, a processor or a dedicated circuit other than the CPU may perform the processes of some of the steps in the flow charts.

First, in step S31, the processing section 12 of the server 1 determines whether or not an advertisement registration request is received from the advertisement provision terminal 3. If the result of the determination in step S31 is affirmative, the processes of steps S32 and S33 are executed. If, on the other hand, the result of the determination in step S31 is negative, the processes of steps S32 and S33 are skipped, and the process of step S34 is executed.

In step S32, the processing section 12 executes a charging process (step S3 shown in FIG. 5). For example, if the advertisement rate is to be paid using the points of the advertiser, the point information included in the user information (of the advertiser) stored in the storage section 13 is updated by subtracting points corresponding to the advertisement rate. In the subsequent step S33, the processing section 12 generates advertisement information based on the advertisement registration request received in step S31 and stores the advertisement information in the storage section 13 (step S4 shown in FIG. 5). After step S33, the process of step S34 is executed.

In step S34, the processing section 12 executes an advertisement transmission process. The advertisement transmission process is the process of, in accordance with the fact that position history information is received from the user terminal 2, determining a transmission condition and transmitting to the user terminal 2 an advertisement for which the transmission condition is satisfied (steps S8, S9, and S14 shown in FIG. 5). The details of the advertisement transmission process will be described later.

In step S35, the processing section 12 executes a viewing notification reception process. The viewing notification reception process is the process executed in accordance with the fact that a viewing notification is received from the user terminal 2 (steps S12, S13, and S15 to S18 shown in FIG. 5). That is, the viewing notification reception process is the process of, in accordance with a viewing notification, giving points to the user, transmitting a related image to the user terminal 2, or determining an ending condition, where necessary. The details of the viewing notification reception process will be described later.

In step S36, the processing section 12 executes a product provision process. Here, although not shown in FIG. 5, in the example embodiment, as the network service, the server 1 provides a product for which the payment is made using points. In the example embodiment, the product is an application (for example, a game application) or data for use in an application (for example, an item for use in a game). Specifically, the server 1 manages a shopping site for the user to purchase a product using points. In accordance with the fact that a request to purchase a product in exchange for points in the shopping site is made by a user terminal, the processing section 12 transmits data according to the product to the user terminal and performs a charging process corresponding to the price of the product. The charging process is performed by updating the point information included in the user information (of the user having purchased the product) stored in the storage section 13, similarly to the process of step S32. It should be noted that a specific example of the network service for providing a product for which the payment is made using points is optional. The product may be provided by another method other than the above method, or the charging process may be performed by another method other than the above method.

In step S37, the processing section 12 executes a server gallery process. The server gallery process is the process of providing a list page in an advertisement gallery for the user terminal 2 and causing the user terminal 2 to reproduce an advertisement selected by the user from the list page (FIG. 14). The details of the server gallery process will be described later.

The server 1 repeatedly executes the processes of steps S31 to S37. It should be noted that in FIG. 16, the processes of steps S31 to S33, the process of step S34, the process of step S35, the process of step S36, and the process of step S37 are executed in order in series. Alternatively, these processes may be executed in parallel.

(Details of Advertisement Transmission Process)

Figure 17:
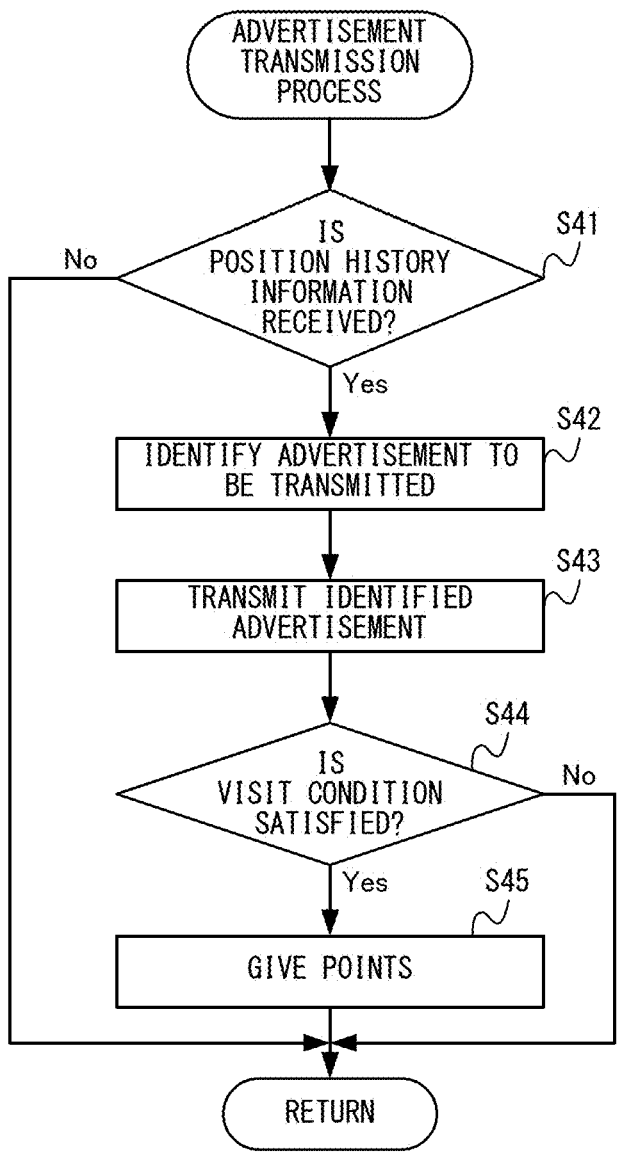
FIG. 17 is a sub-flow chart showing a non-limiting example of the flow of the detailed processing of an advertisement transmission process (step S34) shown in FIG. 16.

Next, with reference to FIG. 17, a description is given of the details of the advertisement transmission process (step S34) shown in FIG. 16. FIG. 17 is a sub-flow chart showing an example of the flow of the detailed processing of the advertisement transmission process (step S34) shown in FIG. 16.

In the advertisement transmission process, first, in step S41, the processing section 12 determines whether or not position history information is received from any one of the user terminals 2 included in the information processing system. If the result of the determination in step S41 is affirmative, the process of step S42 is executed. If, on the other hand, the result of the determination in step S41 is negative, the processing section 12 ends the advertisement transmission process.

In step S42, based on the position history information received in step S41, the processing section 12 identifies an advertisement to be transmitted to the user terminal 2 (step S8 shown in FIG. 5). In the subsequent step S43, the processing section 12 transmits the advertisement identified in step S42 to the user terminal 2 having transmitted the position history information (step S9 shown in FIG. 5).

Next, in step S44, based on the position history information received in step S41, the processing section 12 determines whether or not the visit condition regarding the advertisement reproduced in the user terminal 2 having transmitted the position history information is satisfied (step S14 shown in FIG. 5). If there is no advertisement for which the visit condition is satisfied, the processing section 12 ends the advertisement transmission process. If, on the other hand, there is an advertisement for which the visit condition is satisfied, the process of step S45 is executed. That is, in step S45, the processing section 12 updates the point information included in the user information of the user of the user terminal 2 having transmitted the position history information (step S14 shown in FIG. 5). Consequently, points are given to the user. After step S45, the processing section 12 ends the advertisement transmission process.

(Details of Viewing Notification Reception Process)

Figure 18:
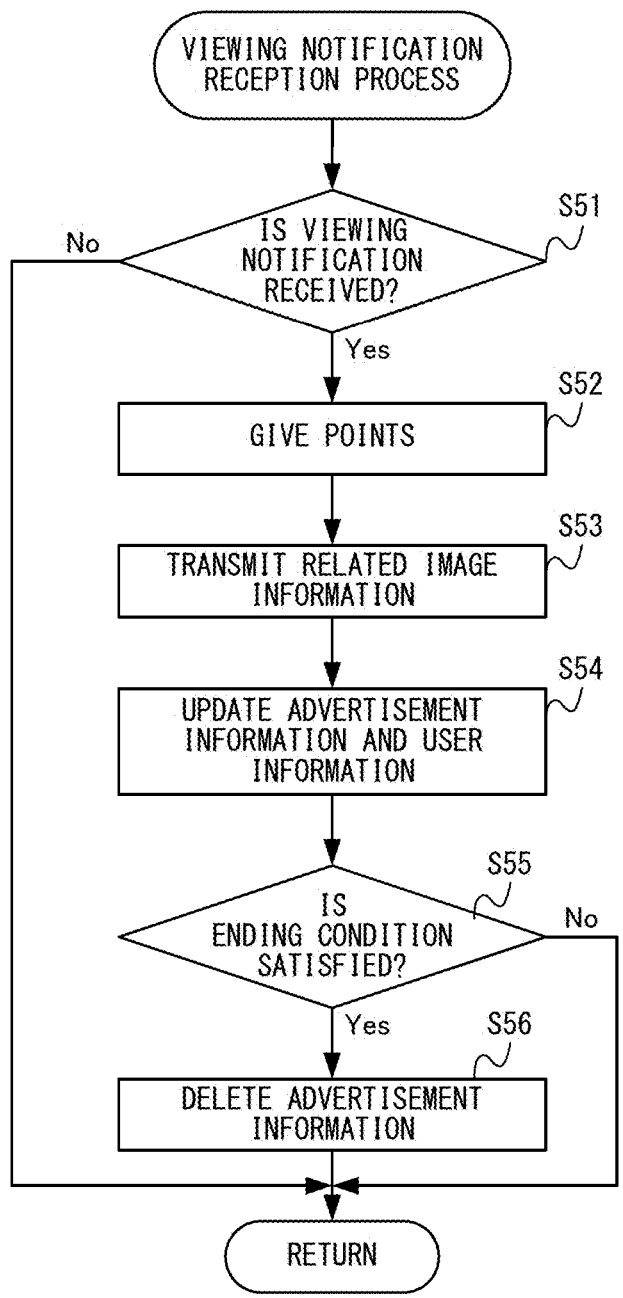
FIG. 18 is a sub-flow chart showing a non-limiting example of the flow of the detailed processing of a viewing notification reception process (step S35) shown in FIG. 16.

Next, with reference to FIG. 18, a description is given of the details of the viewing notification reception process (step S35) shown in FIG. 16. FIG. 18 is a sub-flow chart showing an example of the flow of the detailed processing of the viewing notification reception process (step S35) shown in FIG. 16.

In the viewing notification reception process, first, in step S51, the processing section 12 determines whether or not a viewing notification is received from any one of the user terminals 2 included in the information processing system. If the result of the determination in step S51 is affirmative, the process of step S52 is executed. If, on the other hand, the result of the determination in step S51 is negative, the processing section 12 ends the viewing notification reception process.

In step S52, the processing section 12 updates the point information included in the user information of the user of the user terminal 2 having transmitted the viewing notification (step S12 shown in FIG. 5). Consequently, points are given to the user. In the subsequent step S53, the processing section 12 transmits related image information corresponding to the advertisement related to the viewing notification to the user terminal 2 having transmitted the viewing notification (step S13 shown in FIG. 5). It should be noted that if a related image is not set for the advertisement related to the viewing notification (that is, if the advertisement information of the advertisement does not include related image information), the process of step S53 is not executed. After step S53, the process of step S54 is executed.

In step S54, the processing section 12 updates advertisement information and user information related to the viewing notification received in step S51, where necessary (step S15 shown in FIG. 5). In the subsequent step S55, based on information after the update process in step S54, the processing section 12 determines whether or not the ending condition for the advertisement related to the viewing notification is satisfied (step S16 shown in FIG. 5). If the result of the determination in step S55 is affirmative, the process of step S56 is executed. If, on the other hand, the result of the determination in step S55 is negative, the processing section 12 ends the viewing notification reception process.

In step S56, the processing section 12 deletes from the storage section 13 the advertisement information regarding the advertisement for which the ending condition is satisfied (step S17 shown in FIG. 5). Further, the processing section 12 transmits, to the advertisement provision terminal as the transmission source of the advertisement, an advertisement ending notification that the registration of the advertisement is ended (step S18 shown in FIG. 5). After step S56, the processing section 12 ends the viewing notification reception process.

(Details of Server Gallery Process)

Figure 19:
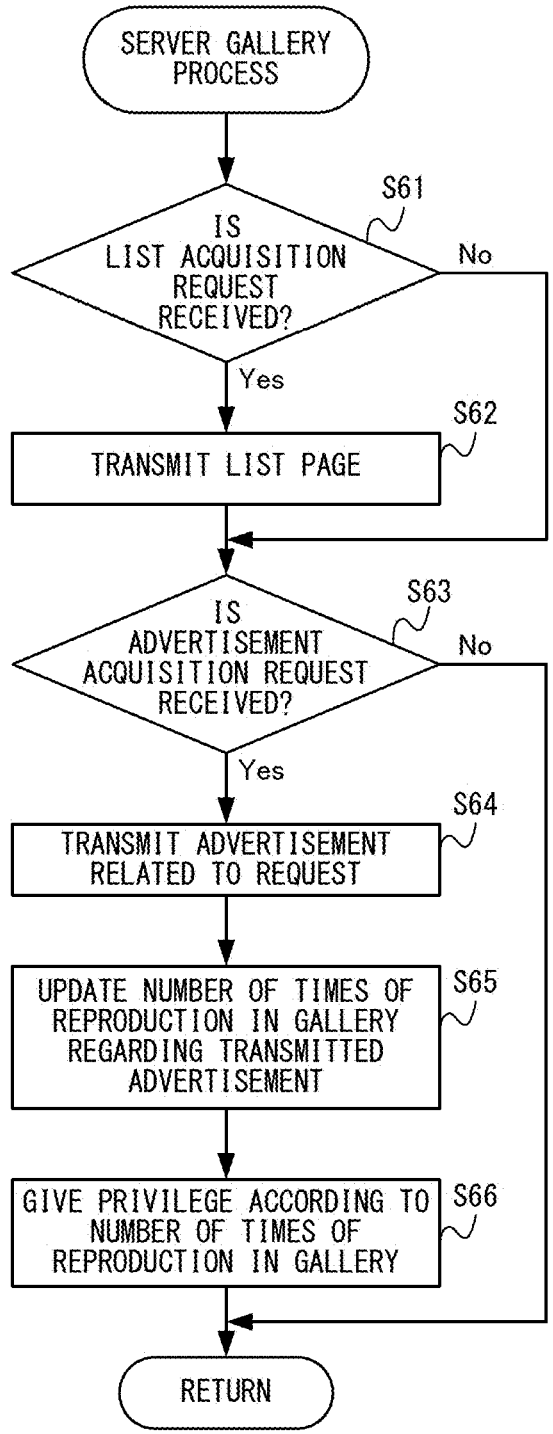
FIG. 19 is a sub-flow chart showing a non-limiting example of the flow of the detailed processing of a server gallery process (step S37) shown in FIG. 16.

Next, with reference to FIG. 19, a description is given of the details of the server gallery process (step S37) shown in FIG. 16. FIG. 19 is a sub-flow chart showing an example of the flow of the detailed processing of the server gallery process (step S37) shown in FIG. 16.

In the server gallery process, first, in step S61, the processing section 12 determines whether or not a list acquisition request is received from any one of the user terminals 2 included in the information processing system. If the result of the determination in step S61 is affirmative, the process of step S62 is executed. If, on the other hand, the result of the determination in step S61 is negative, the process of step S62 is skipped, and the process of step S63 is executed.

In step S62, the processing section 12 transmits a list page of an advertisement gallery to the user terminal 2 as the transmission source of the list acquisition request received in step S61 (step S22 shown in FIG. 14). It should be noted that the list page to be transmitted may be generated in accordance with the reception of the list acquisition request, or may be generated in advance. After step S62, the process of step S63 is executed.

In step S63, the processing section 12 determines whether or not an advertisement acquisition request is received from any one of the user terminals 2 included in the information processing system. If the result of the determination in step S63 is affirmative, the process of step S64 is executed. If, on the other hand, the result of the determination in step S63 is negative, the processing section 12 ends the server gallery process.

In step S64, the processing section 12 transmits the advertisement related to the advertisement acquisition request to the user terminal 2 as the transmission source of the advertisement acquisition request (step S25 shown in FIG. 14). Consequently, the advertisement is reproduced in the user terminal 2. After step S64, the process of step S65 is executed.

In step S65, the processing section 12 updates the advertising effectiveness information included in the advertisement information regarding the advertisement transmitted in step S64 (step S27 shown in FIG. 14). Specifically, the value of the number of times of the reproduction in the gallery indicated by the advertising effectiveness information is updated. In the subsequent step S66, the processing section 12 updates the point information included in the user information of the advertiser, where necessary, based on the advertising effectiveness information (step S28 shown in FIG. 14). Consequently, points are given to the advertiser. After step S66, the processing section 12 ends the server gallery process.

4. Processing by User Terminal

Figure 20:
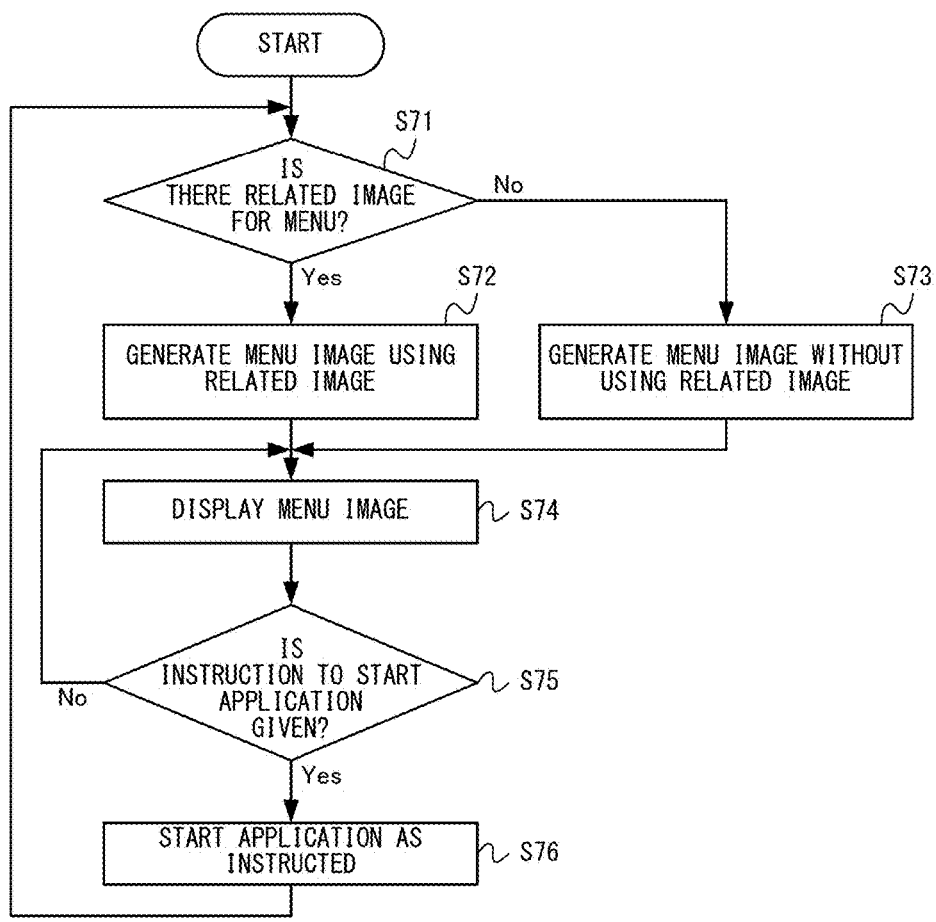
FIG. 20 is a flow chart showing a non-limiting example of the flow of the processing executed by the user terminal.

Next, a description is given of a specific example of the processing executed by the user terminal 2. FIG. 20 is a flow chart showing an example of the flow of the processing executed by the user terminal 2. A series of processes shown in FIG. 20 is started in accordance with the fact that the user terminal 2 is started, and is repeatedly executed during the operation of the user terminal 2. It should be noted that if the user terminal 2 is composed of a plurality of information processing apparatuses, each process shown in FIG. 20 (the same applies to each process shown in FIGS. 21 to 23) may be executed by the cooperation of the plurality of information processing apparatuses.

In the example embodiment, if the user terminal 2 is started, first, in the processes of steps S71 to S74, menu images (see FIG. 13) are displayed on the display section 26. Specifically, in step S71, the processing section 22 determines whether or not there is a related image that can be used in the menu images. This determination can be made based on the related image information stored in the storage section 23. In the example embodiment, related image information includes program information indicating a program for applying a related image. Thus, if related image information including program information indicating a system program for displaying a menu image is stored in the storage section 23, the processing section 22 determines that there is a related image that can be used in the menu images. If, on the other hand, related image information including program information indicating the system program is not stored in the storage section 23, the processing section 22 determines that there is no related image that can be used in the menu images. If the result of the determination in the above step S71 is affirmative, the process of step S72 is executed. If, on the other hand, the result of the determination in step S71 is negative, the process of step S73 is executed.

In step S72, the processing section 22 generates a menu image using the related image that can be used in the menu images. That is, the processing section 22 generates a menu image by making an addition and/or a change based on the above related image to a menu image generated without using a related image. Consequently, for example, as shown in FIG. 13, a menu image obtained by adding the balloon image 53 to the avatar 51 is generated. After step S72, the process of step S74 is executed.

On the other hand, in step S73, the processing section 22 generates a menu image without using a related image (that is, by a normal method). In this case, for example, a menu image is generated by not adding the balloon image 53 to the avatar 51. After step S73, the process of step S74 is executed.

In step S74, the processing section 22 displays the menu image generated in step S72 or S73 on the display section 26. In the subsequent step S75, the processing section 22 determines whether or not an instruction to start an application is given by the user. That is, the processing section 22 determines whether or not an instruction to specify an icon included in the menu images (for example, one of the icons 52 shown in FIG. 13) is given. If the result of the determination in the above step S75 is affirmative, the process of step S76 is executed. If, on the other hand, the result of the determination in step S75 is negative, the process of step S74 is executed again.

In step S76, the processing section 22 starts the application of which the start is instructed in step S75. Consequently, the execution of the application stored in the user terminal 2, such as the above advertisement viewing application, is started. If the application is ended, the processing section 22 executes the process of step S71 again. That is, if the application is ended, the menu images are displayed again.

Further, in the example embodiment, during the series of processes shown in FIG. 20, the processing section 22 executes the process of acquiring position history information at appropriate timing. That is, the processing section 22 successively acquires position information successively detected by the position detection section 24 and stores, in the storage section 23, position history information including each piece of position information successively acquired while the user is out (step S5 shown in FIG. 5). The above process may be executed not only during the display of the menu images, but also during the execution of the application (during the process of step S76). Further, the above process may be executed when the user terminal 2 is in a sleep state (for example, in the state where the display section 26 is turned off).

It should be noted that during the series of processes shown in FIG. 20, the processing section 22 may execute another process other than the above series of processes. For example, the processing section 22 may execute the process of purchasing a product in the shopping site in the server 1. That is, the processing section 22 may execute the process of transmitting to the server 1 a request to purchase (acquire) a product specified by the user in exchange for points, and receiving the product (for example, content data) transmitted from the server 1 in accordance with the request.

Further, for example, if the menu images can be scrolled, the processing section 22 may execute the process of displaying the menu images in accordance with a scrolling operation of the user by scrolling the menu images during the series of processes shown in FIG. 20.

Figure 21:
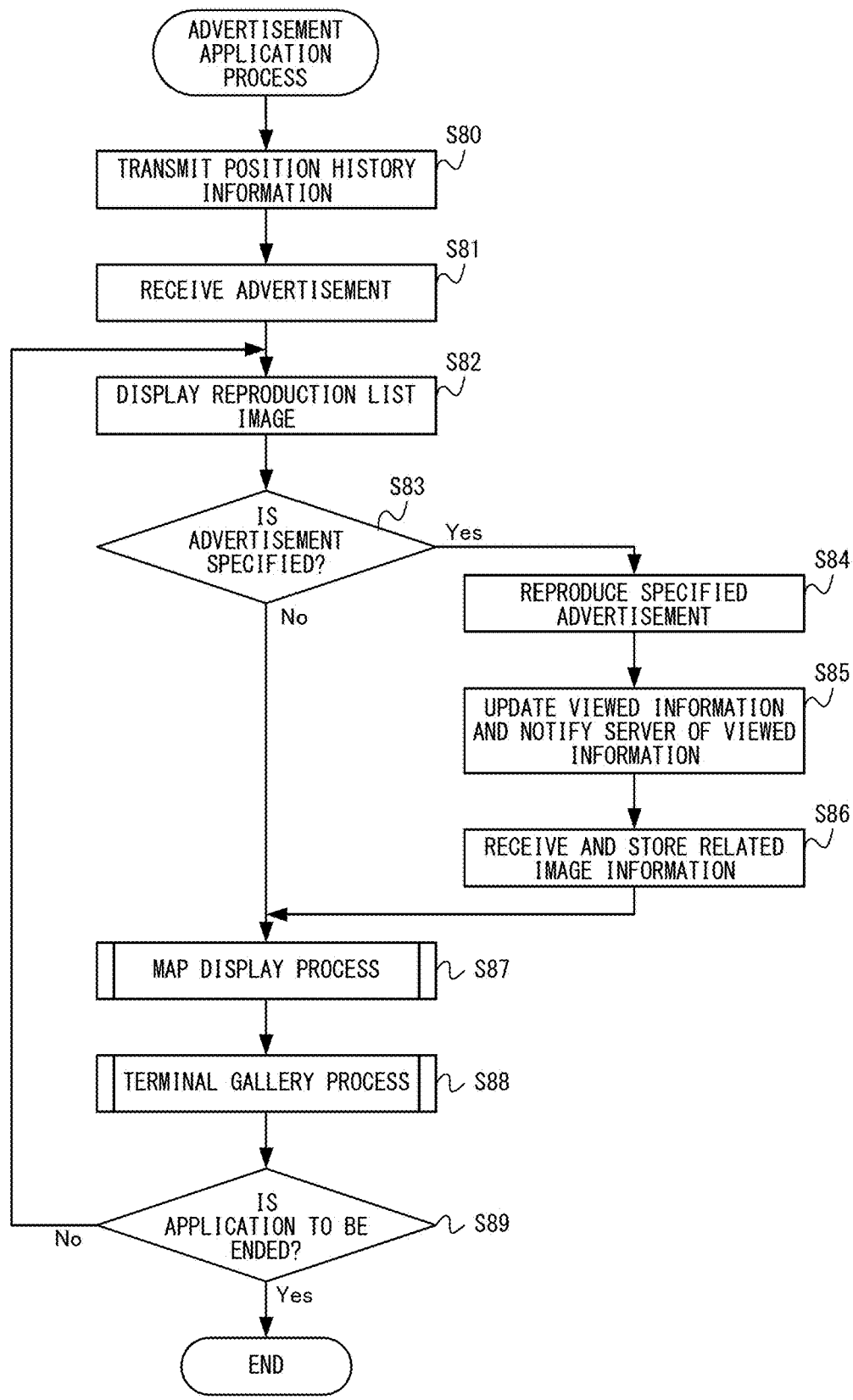
FIG. 21 is a flow chart showing a non-limiting example of the flow of an advertisement application process executed by the user terminal.
Figure 22:
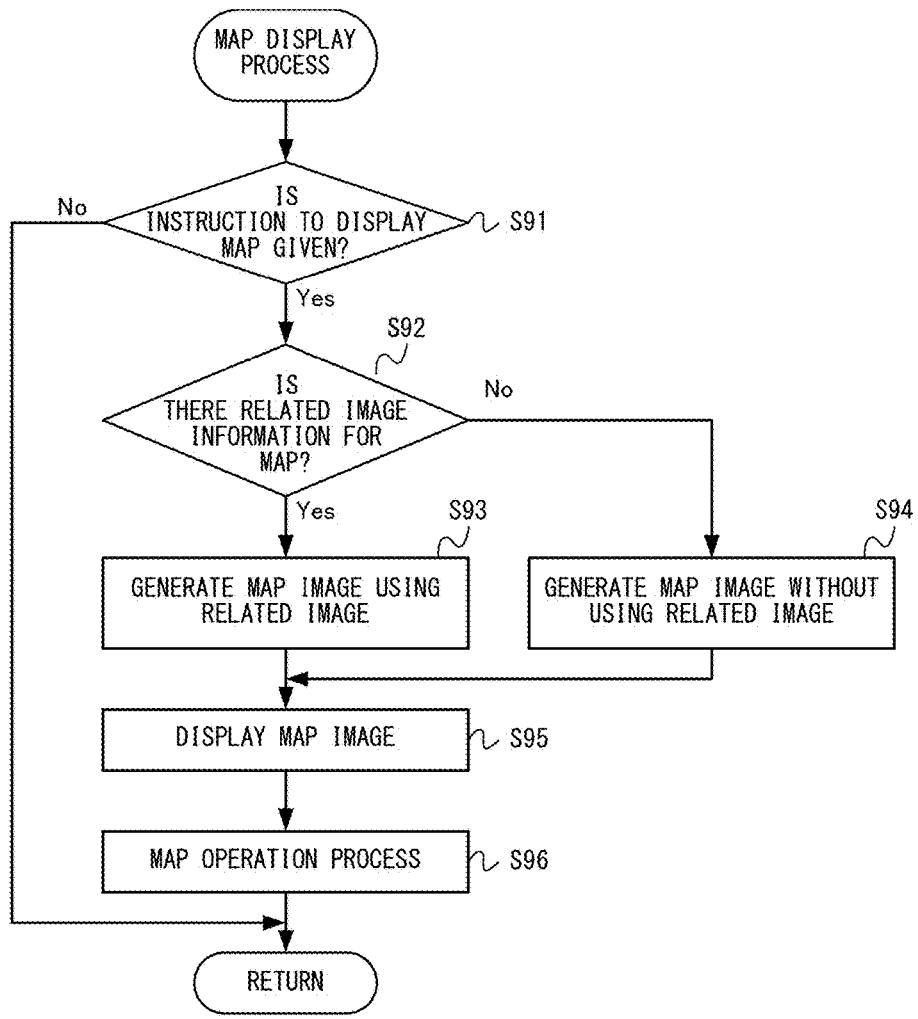
FIG. 22 is a sub-flow chart showing a non-limiting example of the flow of the detailed processing of a map display process (step S87) shown in FIG. 21.
Figure 23:
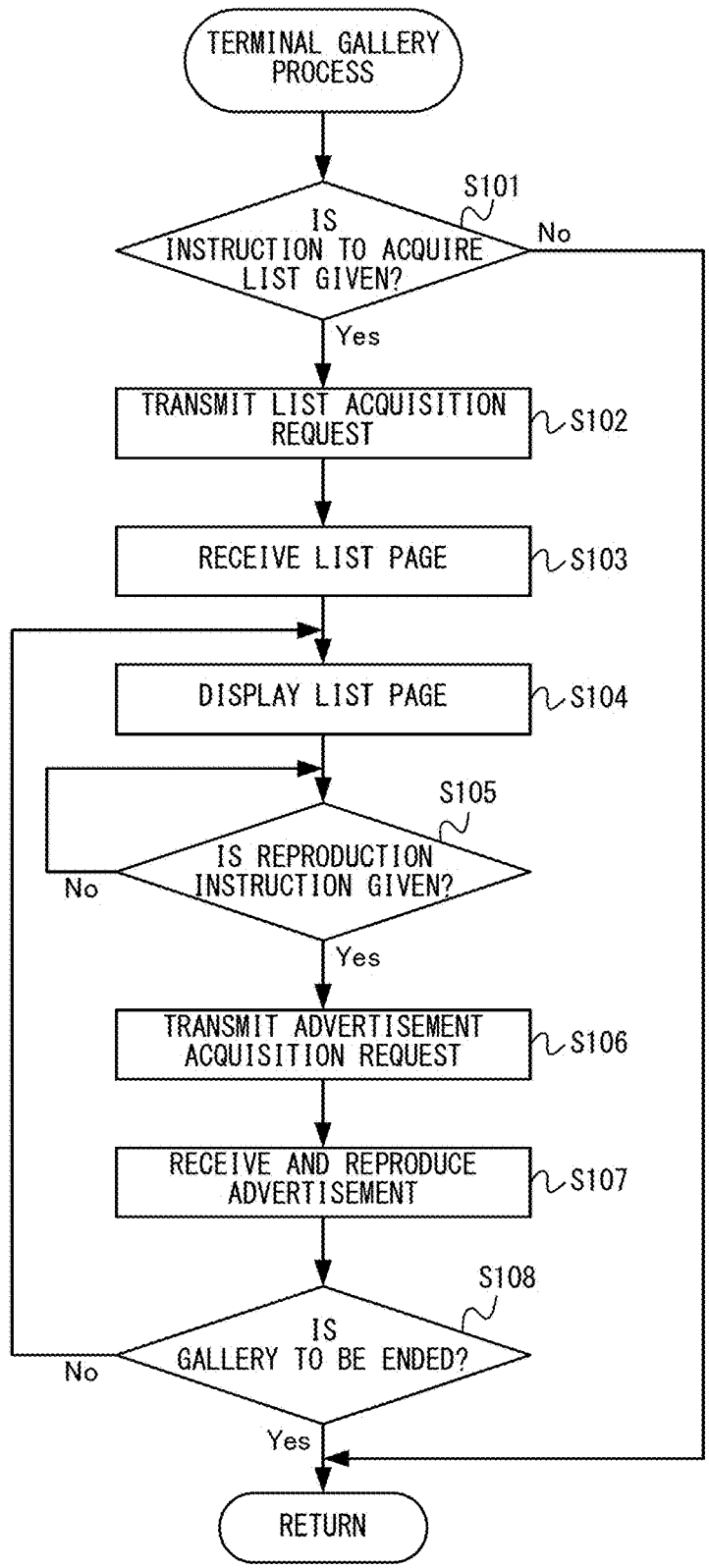
FIG. 23 is a sub-flow chart showing a non-limiting example of the flow of the detailed processing of a gallery process (step S88) shown in FIG. 21.

Next, with reference to FIGS. 21 to 23, a description is given of a specific example of information processing (for example, an advertisement application process) as a result of the user terminal 2 executing the advertisement viewing application. FIG. 21 is a flow chart showing an example of the flow of the advertisement application process executed by the user terminal 2. A series of processes shown in FIG. 21 is started in accordance with the fact that an instruction to start the advertisement viewing application is given in the above step S74.

In the advertisement application process, first, in step S80, the processing section 22 transmits the position history information stored in the storage section 23 to the server 1 (step S7 shown in FIG. 5). Further, in the subsequent step S81, the processing section 22 receives an advertisement transmitted from the server 1 in accordance with the above position history information (step S9 shown in FIG. 5) and stores the advertisement in the storage section 23. It should be noted that if the user terminal 2 cannot communicate with the server 1, the processes of steps S80 and S81 are not executed. After step S81, the process of step S82 is executed.

In step S82, the processing section 22 displays the above reproduction list image (see FIG. 9) on the display section 26 (step S10 shown in FIG. 5). It should be noted that if the processes of the above steps S80 and S81 are executed before the process of step S82, the reproduction list image including the advertisement acquired from the server 1 by these processes is displayed.

In step S83, the processing section 22 determines whether or not an advertisement to be reproduced is specified (step S10 shown in FIG. 5). That is, the processing section 22 determines whether or not any one of the title images included in the reproduction list image displayed in step S82 is specified by the user. If the result of the determination in step S83 is affirmative, the series of processes of steps S84 to S86 is executed. If, on the other hand, the result of the determination in step S83 is negative, the series of processes of steps S84 to S86 is skipped, and the process of step S87 is executed.

In step S84, the processing section 22 reproduces the advertisement specified in step S83 (step S10 shown in FIG. 5). If the reproduction of the advertisement is ended, the processing section 22 executes the process of step S85. In step S85, the processing section 22 updates the viewed information stored in the storage section 23 and transmits a viewing notification to the server 1 (step S11 shown in FIG. 5). In accordance with the fact that the viewing notification is received, the server 1 transmits related image information to the user terminal 2, where necessary (step S13 shown in FIG. 5). It should be noted that in the above step S85, the point information stored in the storage section 23 is updated. Further, in the subsequent step S86, the processing section 22 receives the related image information transmitted from the server 1 (step S13 shown in FIG. 5) and stores the related image information in the storage section 23. After step S86, the process of step S87 is executed.

In step S87, the processing section 22 executes a map display process. The map display process is the process of, in accordance with the fact that an instruction to display a map is given by the user, displaying map images (see FIG. 11) on the display section 26. The details of the map display process will be described later.

In step S88, the processing section 22 executes a terminal gallery process. The terminal gallery process is the process of acquiring a list page of an advertisement gallery from the server 1 and reproducing an advertisement selected by the user from the list page (FIG. 14). The details of the terminal gallery process will be described later.

In step S89, the processing section 22 determines whether or not the advertisement viewing application is to be ended. That is, the processing section 22 determines whether or not an instruction to end the advertisement viewing application is given by the user. If the result of the determination in step S89 is negative, the process of step S82 is executed again. After this, the series of processes of steps S82 to S89 is repeatedly executed until it is determined in step S89 that the advertisement viewing application is to be ended. If, on the other hand, the result of the determination in step S89 is affirmative, the processing section 22 ends the advertisement application process.

Further, although not shown in the figures, in the advertisement application process, if the passing button 36 is specified during the display of the reproduction list image, the processing section 22 executes the above passing process.

Next, with reference to FIG. 22, a description is given of the details of the map display process (step S87) shown in FIG. 21. FIG. 22 is a sub-flow chart showing an example of the flow of the detailed processing of the map display process (step S87) shown in FIG. 21.

In the map display process, first, in step S91, the processing section 22 determines whether or not an instruction to display the map is given by the user. That is, the processing section 22 determines whether or not the map button 35 is specified by the user in the reproduction list image. If the result of the determination in step S91 is affirmative, the processing section 22 starts the above map application, thereby executing the process of step S92. It should be noted that the series of processes of steps S92 to S96 is performed by the processing section 22 executing the above map application. If, on the other hand, the result of the determination in step S91 is negative, the processing section 22 ends the map display process.

In step S92, the processing section 22 determines whether or not there is a related image that can be used in the map images (the map application). This determination can be made by a method similar to that of the determination in the above step S71. That is, the above determination can be made based on whether or not related image information including program information indicating the map application is stored in the storage section 23. If the result of the determination in step S92 is affirmative, the process of step S93 is executed. If, on the other hand, the result of the determination in step S92 is negative, the process of step S94 is executed.

In step S93, the processing section 22 generates a map image using the related image that can be used in the map application. That is, the processing section 22 generates a map image by making an addition and/or a change based on the above related image to a map image generated without using a related image. Consequently, for example, as shown in FIG. 11, a map image obtained by adding a shop icon is generated. After step S93, the process of step S95 is executed.

On the other hand, in step S94, the processing section 22 generates a map image without using a related image (that is, by a normal method). In this case, for example, a map image is generated by not adding a shop icon. After step S94, the process of step S95 is executed.

In step S95, the processing section 22 displays the map image generated in step S93 or S94 on the display section 26. In the subsequent step S96, the processing section 22 executes a map operation process for operating the displayed map image. That is, the processing section 22 executes the process of displaying the displayed map by moving (scrolling), enlarging, or reducing the displayed map in accordance with an operation of the user. The process of step S96 ends in accordance with the fact that an instruction to end the display of the map is given by the user. After step S96, the processing section 22 ends the map display process.

Next, with reference to FIG. 23, a description is given of the details of the gallery process (step S88) shown in FIG. 21. FIG. 23 is a sub-flow chart showing an example of the flow of the detailed processing of the gallery process (step S88) shown in FIG. 21.

In the gallery process, first, in step S101, the processing section 22 determines whether or not an instruction to acquire a list page is given by the user. That is, the processing section 22 determines whether or not the operation of specifying the gallery button 37 in the above reproduction list image is performed by the user. If the result of the determination in step S101 is affirmative, the process of step S102 is executed. If, on the other hand, the result of the determination in step S101 is negative, the processing section 22 ends the gallery process.

In step S102, the processing section 22 transmits a list acquisition request to the server 1 (step S21 shown in FIG. 14). In accordance with this list acquisition request, the server 1 transmits a list page of an advertisement gallery to the user terminal 2. In the subsequent step S103, the processing section 22 receives the list page transmitted from the server 1 (step S22 shown in FIG. 14). Further, in the subsequent step S104, the processing section 22 displays the received list page (FIG. 15) on the display section 26 (step S23 shown in FIG. 14).

In step S105, the processing section 22 determines whether or not an instruction to reproduce any one of the advertisements included in the list page is given by the user. That is, the processing section 22 determines whether or not the operation of specifying an image of the outline information included in the list page (for example, one of the images 61 and 62 shown in FIG. 15) is performed. If the result of the determination in step S105 is affirmative, the process of step S106 is executed. If, on the other hand, the result of the determination in step S105 is negative, the processing section 22 executes the process of step S105 again. That is, the processing section 22 waits in the state of displaying the list page and receives an instruction to reproduce an advertisement.

In step S106, the processing section 22 transmits to the server 1 an advertisement acquisition request for acquiring the advertisement indicated in step S105 (step S24 shown in FIG. 14). In accordance with this advertisement acquisition request, the server 1 transmits the indicated advertisement to the user terminal 2. In the subsequent step S107, the processing section 22 receives the advertisement from the server 1 and reproduces the advertisement on the display section 26 (step S26 shown in FIG. 14). If the reproduction of the advertisement in step S107 is completed, the process of step S108 is executed.

In step S108, the processing section 22 determines whether or not the terminal gallery process is to be ended. That is, the processing section 22 determines whether or not an instruction to end the advertisement gallery is given by the user. If the result of the determination in step S108 is negative, the process of step S104 is executed again. After this, the series of processes of steps S104 to S108 is repeatedly executed until it is determined in step S108 that the advertisement gallery is to be ended. If, on the other hand, the result of the determination in step S108 is affirmative, the processing section 22 ends the terminal gallery process.

5. Operation and Effect of Example Embodiment

As described above, the information processing system according to the example embodiment includes a plurality of user terminals 2 and a server 1 capable of communicating with each user terminal 2 (FIG. 1). The server 1 stores an advertisement (an advertisement content) and a transmission condition for the advertisement in association with each other and stores, with respect to each user, privilege information (for example, point information) indicating a privilege (for example, points) to be given to the user of the user terminal 2 (FIG. 7). The server 1 transmits to, a user terminal 2 for which the transmission condition is satisfied, the advertisement associated with the transmission condition (steps S9 and S43). Further, the server 1 acquires viewing information (viewed information) indicating the state of viewing the advertisement in the user terminal 2 (steps S11 and SM) and updates the privilege information by giving the privilege regarding the state indicated by the acquired viewing information to the user of the user terminal 2 for which the viewing information is acquired (steps S12 and S52). It should be noted that the process of determining whether or not the transmission condition for a user terminal 2 is satisfied (steps S8 and S42) may be executed on the server 1 side, or may be executed on the user terminal 2 side, as in the above example embodiment.

Based on the above, the information processing system can transmit an advertisement to a user terminal 2 for which the transmission condition is satisfied, and therefore can efficiently transmit the advertisement by narrowing down targets. Further, it is possible to reduce the transmission of an advertisement to a user that is not a target (for which the transmission condition is not satisfied). Thus, it is also possible to provide the effect of reducing the amount of communication for the transmission of the advertisement. Here, the method for transmitting an advertisement by narrowing down advertisement targets as described above reduces the number of user terminals to which the advertisement is to be transmitted (as compared with a method that does not narrow down targets). This leads to reducing the number of users who will view the advertisement. According to the above example embodiment, however, in accordance with the state of viewing an advertisement, a privilege is given to a user. Thus, it is possible to provide the user with a motivation to watch the advertisement. Thus, it is possible to efficiently obtain advertising effectiveness regarding the advertisement transmitted to the user terminal.

It should be noted that a specific example of the above "privilege" is optional, and may be points or a related image in the example embodiment, or may be a product (including content data) or a service.

Further, the information processing system further includes an advertisement provision terminal 3 capable of communicating with the server 1. The advertisement provision terminal 3 transmits an advertisement registration request including an advertisement and a transmission condition (step S2). The server 1 stores the advertisement content and the transmission condition included in the advertisement registration request received from the advertisement provision terminal 3 in association with each other (steps S4 and S33). Further, under the condition that a condition regarding exchange (for example, an advertisement rate) for the transmission of an advertisement to the user terminal 2 is satisfied (for example, under the condition that the charging process is executed in step S3), the server 1 permits the transmission of the advertisement included in the advertisement registration request received from the advertisement provision terminal 3.

Based on the above, the server 1 can receive, from a user of the advertisement provision terminal 3 as an advertiser, the exchange for the transmission of the advertisement to the user terminal 2.

Further, the user terminal 2 transmits position information regarding the position of the user terminal 2 (position history information) to the server 1 (steps S7 and S80). The transmission condition includes a condition regarding the position of the user terminal 2. Using the position information received from the user terminal 2, the server 1 determines whether or not the transmission condition for the user terminal 2 is satisfied (steps S8 and S42). It should be noted that as shown in a variation described later, the user terminal 2 may transmit information regarding an application executed in the user terminal 2 (for example, information of execution history of the application) to the server 1. At this time, based on the information regarding the application, the server 1 may determine whether or not the transmission condition is satisfied.

Based on the above, the server 1 can provide the user terminal 2 with an advertisement corresponding to the position of the user (or the place through which the user has passed) or an advertisement corresponding to an application used by the user, and therefore can efficiently provide an advertisement by narrowing down advertisement target users based on their positions.

Further, based on a viewing notification received from the user terminal 2, the server 1 stores information indicating an advertisement content viewed in the user terminal 2 (viewed information) with respect to each user (FIG. 7). Further, the server 1 stores a visit condition for determining whether or not the user visits an advertisement place (FIG. 7), and using the position information received from the user terminal 2, determines whether or not the visit condition regarding a viewed advertisement is satisfied. If it is determined that the visit condition is satisfied, the server 1 executes a predetermined process (for example, the point giving process in steps S12 and S45).

Based on the above, in accordance with the fact that the user actually visits the advertisement place, the predetermined process is executed. Based on this, the server 1 can execute the predetermined process at appropriate timing corresponding to the fact that the user actually visits the advertisement place. It should be noted that the "predetermined process" may be the above process of giving points, or any process. For example, in another example embodiment, the server 1 may execute as the predetermined process the process of charging the advertisement rate (steps S3 and S32). This enables the server 1 to charge the advertisement rate every time the visit condition is satisfied (that is, every time the user having viewed the advertisement actually visits the advertisement place). Further, the server 1 may execute as the predetermined process the process of providing a related image (steps S13 and S53). Based on this, the user having viewed the advertisement actually visits the advertisement place, thereby adding or changing a related image in the user terminal 2. Further, as the predetermined process, the process of ending the registration of the advertisement (steps S17 and S56) may be executed.

Further, the server 1 stores an ending condition for an advertisement in association with the advertisement (FIG. 7), and if the ending condition is satisfied, ends the transmission of the advertisement associated with the ending condition (steps S17 and S56). Based on this, an ending condition is set as a desired condition, whereby it is possible to end the transmission of an advertisement at desired timing. For example, as in the above example embodiment, an ending condition regarding the number of viewing users is set, whereby it is possible to continue the transmission of an advertisement until the number of users having viewed the advertisement reaches a predetermined number.

Further, in the example embodiment, the above privilege information is information indicating points that can be exchanged for a product and/or a service. It should be noted that a specific example of the privilege to be given to the user is optional, and are not limited to points. For example, in another example embodiment, the privilege may be a product and/or a service itself. Alternatively, the privilege may be data for use in the user terminal 2 (for example, data of an application and/or data for use in the application), such as a related image in the above example embodiment.

Further, the information processing system according to the above example embodiment includes a plurality of user terminals 2 and a server 1 capable of communicating with each user terminal 2. The user terminal 2 transmits position information regarding the position of the user terminal 2 (for example, position history information) to the server 1 (steps S7 and S80). The server 1 stores privilege information (for example, point information) indicating a privilege to be given to a user of the user terminal 2 with respect to each user (FIG. 7). If the position information received from the user terminal 2 satisfies a predetermined privilege condition (for example, satisfies a visit condition in the example embodiment), the server 1 updates the privilege information so as to give a privilege to the user corresponding to the position information (steps S12, S14, S45, and S52).

Based on the above, a privilege is given in accordance with the position information of the user. Thus, for example, it is possible to provide a novel privilege giving system for giving a privilege in accordance with the fact that the user visits a particular place or passes through a particular range.

Further, the server 1 transmits an advertisement to the user terminal 2. The above privilege condition is a visit condition for determining whether or not the user visits an advertisement place. Using the position information received from the user terminal 2, the server 1 determines whether or not the privilege condition is satisfied (step S44).

Based on the above, in accordance with the fact that the user actually visits the advertisement place, a privilege is given to the user. This makes it possible to provide the user with a motivation to visit the advertisement place. This can further increase advertising effectiveness. It should be noted that the advertisement place in the visit condition may be an advertisement place regarding the advertisement transmitted to the user terminal 2 as in the above example embodiment. At this time, it is possible to further increase the advertising effectiveness of the transmitted advertisement.

Further, the user terminal 2 transmits, as the above position information, information regarding the acquired history of the position (position history information). Alternatively, in another example embodiment, the user terminal 2 may transmit information regarding the current position, instead of the position history information or together with the position history information.

In the above example embodiment, the server 1 acquires state information indicating that the advertisement is viewed in the user terminal 2 (viewed information) (steps S11 and S51). Further, the server 1 updates the privilege information so as to give a privilege regarding the state information to the user of the user terminal 2 corresponding to the acquired state information (steps S12 and S52). It should be noted that the above "state information" may indicate that the advertisement is received by the user terminal 2. Based on the above, the information processing system gives a privilege to the user in accordance with the state of the reception or the viewing of the advertisement, and therefore can provide the user with a motivation to receive or view the advertisement. This makes it possible to efficiently obtain the advertising effectiveness of the advertisement transmitted to the user terminal 2.

Further, in the above example embodiment, the user terminal 2 transmits to the server 1 a request to acquire content data specified by the user in exchange for points, and in accordance with the request, acquires the content data transmitted from the server. It should be noted that the above "content" has the meaning including a video (image) production such as a movie and a television program, a game, a software application, a database, a website, program software, text, comic, music, an animation, a photograph, art, CG, a character, and the like.

Based on the above, the user can use points to acquire content data provided by the server 1. This makes it possible to give a privilege useful for the user.

The information processing system according to the above example embodiment includes a plurality of user terminals 2 and a server 1 capable of communicating with each user terminal 2. The server 1 transmits an advertisement to the user terminal 2. In the above example embodiment, the user terminal 2 executes a first program for displaying an advertisement (for example, an advertisement viewing application), thereby displaying the advertisement received from the server 1 on the display section 26 (the advertisement application process shown in FIG. 21). The user terminal 2 stores related image information indicating a related image related to the advertisement (FIG. 8). When executing a second program that is a program different from the first program and can be executed in the user terminal 2 (for example, a system program, a map application, or a game program in the above example embodiment), the user terminal 2 displays on the display section 26 an image by changing an image based on the second program using the related image information (FIG. 13).

It should be noted that the above related image stored in the user terminal 2 may be received from the server 1 as in the above example embodiment, or may be acquired by any method. For example, the related image may be acquired by the user terminal 2 from a storage medium attachable to and detachable from the user terminal 2, or may be acquired by the user terminal 2 from an external apparatus different from the server 1.

Based on the above, the user terminal 2 displays the advertisement using the first program and displays the related image regarding the advertisement using the second program. Thus, based on the above, not only the advertisement is simply presented, but also the related image is displayed in the situation where the advertisement is not displayed. Thus, the related image can remind a user of information regarding the advertisement such as the advertisement, a product related to the advertisement, or an advertiser. This can further increase advertising effectiveness.

Further, the above second program may be a game program. At this time, the user terminal 2 may display on the display section 26 a related image of an item representing a product regarding the advertisement. Based on this, the related image functions as a privilege in a game. This makes it possible to provide the user with a motivation to receive or reproduce the advertisement. This can increase advertising effectiveness.

Further, the above second program may be a program for displaying a map image representing the real world or a virtual world (for example, the above map application). At this time, the advertisement is associated with a position in the real world or the virtual world, and the user terminal 2 displays the related image at the position associated with the advertisement (FIGS. 11 and 12, step S95). This enables the user to confirm a place associated with the advertisement on the map. This makes it possible to provide the user with a motivation to visit the place associated with the advertisement. This can increase advertising effectiveness.

Further, the above second program may be a program for displaying a menu image for giving an instruction to execute an application program (for example, the above system program). At this time, the user terminal 2 may change at least part of a user interface image included in the menu image (for example, an image of an icon or an image of an avatar) and/or a background image (FIG. 13). Based on this, the related image is displayed in a menu image considered to be frequently watched by the user in the user terminal 2. This makes it possible to provide the user with a motivation to watch the advertisement on more opportunities. This can further increase advertising effectiveness.

Further, the above related image may be displayed under any condition, and for example, may be displayed under the condition that the advertisement regarding the related image is reproduced (for example, displayed) in the user terminal 2 as in the above example embodiment. That is, in accordance with the fact that the advertisement is reproduced in the user terminal 2, the user terminal 2 may permit the display of the related image regarding the advertisement. This makes it possible to provide the user with a motivation to receive the advertisement. This can increase advertising effectiveness.

Further, for example, the related image may be displayed under the condition that the advertisement regarding the related image is received by the user terminal 2. That is, in accordance with the fact that an advertisement content is received by the user terminal 2 from the server 1, the user terminal 2 may permit the display of the related image regarding the advertisement content. This makes it possible to provide the user with a motivation to view the advertisement. This can increase advertising effectiveness.

Further, for example, the related image may be displayed in accordance with the fact that the above visit condition is satisfied. That is, based on position information regarding the position of the user terminal 2 (for example, position history information), the information processing system determines whether or not the user visits an advertisement place (S44). At this time, the user terminal 2 may permit the display of the related image regarding the advertisement regarding which the advertisement place is visited by the user according to the determination. This makes it possible to provide the user with a motivation to actually visit the advertisement place regarding the advertisement. This can increase advertising effectiveness.

Further, in accordance with the state of viewing the advertisement in the user terminal 2, the user terminal 2 may change the display form of the related image (FIGS. 11 and 12). This makes it possible to provide the user with a motivation to view the advertisement. This can increase advertising effectiveness.

Further, in accordance with the state of visiting the advertisement place, the user terminal 2 may change the display form of the related image. That is, the user terminal 2 may change the display form of the related image regarding the advertisement regarding which the advertisement place is visited by the user according to the determination. This makes it possible to provide the user with a motivation to actually visit the advertisement place regarding the advertisement. This can increase advertising effectiveness.

Further, in the above example embodiment, in accordance with the type of a reproduced advertisement (or the number of reproduced advertisements), the user terminal 2 changes the display of at least one of the avatar 51 of the user and a menu image for giving an instruction to execute an application program that can be executed in the user terminal 2 (FIG. 13). It should be noted that in another example embodiment, the user terminal 2 may change the above display in accordance with the number of received advertisements. Further, in accordance with the type of a received advertisement and/or in accordance with the type of a reproduced advertisement, the user terminal 2 may change the above display.

Based on the above, in accordance with the type of a received or reproduced advertisement or the number of received or reproduced advertisements, a user interface image (for example, the above avatar image or the above menu image) is changed. This makes it possible to provide the user with a motivation to receive or reproduce an advertisement. This can increase advertising effectiveness.

Further, the information processing system according to the above example embodiment includes a plurality of user terminals 2 and a server 1 capable of communicating with each user terminal 2. The server 1 transmits (for example, by push transmission), to a user terminal 2 for which a transmission condition is satisfied, an advertisement associated with the transmission condition (steps S9 and S43). Further, the server 1 transmits advertisement group information (for example, a list page) representing a plurality of advertisements stored in the storage section 13 to the user terminal 2 (steps S22 and S62), and in accordance with a request from the user terminal 2, transmits at least one of the advertisements represented by the advertisement group information to the user terminal 2 (steps S25 and S64). Meanwhile, the user terminal 2 receives the transmitted advertisement by push transmission (step S9) and notifies a user that the transmitted advertisement is received. Further, the user terminal 2 selects at least one of the advertisements represented by the advertisement group information in accordance with an instruction from the user, requests the selected advertisement from the server 1 (steps S24 and S106), and reproduces the advertisement received from the server 1 (steps S26 and S107).

Based on the above, as a result of the satisfaction of the transmission condition, the user terminal 2 can reproduce the advertisement transmitted from the server 1 by push transmission and can also reproduce the advertisement selected by the user from the advertisement group information presented by the server 1. This enables the user to view a desired advertisement even if the transmission condition for the advertisement is not satisfied, and enables an advertiser to obtain more opportunities to have the user view the advertisement. Thus, it is possible to provide the user with more advertisements and increase opportunities to view advertisements. This can increase advertising effectiveness.

Further, the information processing system further includes an advertisement provision terminal 3 capable of communicating with the server 1. The advertisement provision terminal 3 transmits an advertisement registration request including an advertisement and a transmission condition (step S2). The server 1 stores in the storage section 13 the advertisement and the transmission condition included in the advertisement registration request received from the advertisement provision terminal 3 in association with each other (steps S4 and S33). Regarding the transmission by the above push transmission, under the condition that an exchange condition regarding exchange (for example, an advertisement rate) for the transmission of an advertisement to the user terminal 2 is satisfied (for example, under the condition that the charging of the advertisement rate is completed), the server 1 permits the transmission of the advertisement included in the advertisement registration request received from the advertisement provision terminal 3 (steps S4 and S33) and permits the transmission of the advertisement, regardless of the satisfaction of the exchange condition, regarding the transmission of the advertisement represented by the advertisement group information (step S25). It should be noted that "permit the transmission of the advertisement, regardless of the satisfaction of the exchange condition" may mean, for example, permitting the transmission of the advertisement, regardless of whether or not, if the advertiser is requested to pay the advertisement rate, the charging is completed, or permitting the transmission of the advertisement without requesting the advertiser to pay the advertisement rate regarding the transmission of the advertisement represented by the advertisement group information (that is, the advertisement rate is free).

Based on the above, regarding a first method by push communication (regardless of the user's intention), the satisfaction of the exchange condition is required. Regarding a second method in which the user desires the transmission from the server 1 based on their own intention, the satisfaction of the exchange condition is not required. Based on this, when having the user watch the advertisement by the second method, the advertiser can lightly upload the advertisement to the server 1 and can also pay the advertisement rate to have a particular user watch the advertisement by narrowing down targets.

6. Variations (Variation Regarding Transmission Condition)

In the above example embodiment, a transmission condition for determining whether or not an advertisement is to be transmitted is a condition regarding the position of the user terminal 2. Here, in another example embodiment, the transmission condition may be the following conditions.

The transmission condition may include a condition regarding information guessed from the position of the user terminal 2. "Information guessed from or based on the position" is, for example, the following information.

The moving speed of the user passing through a certain place (for example, an advertisement place).

A movement method by which the user passes through a certain place (for example, by foot, by car, or the like)

The time in which the user stays in a certain place

The time zone in which the user stays in a certain place

The frequency with which the user visits a certain place

The moving distance of the user in a predetermined period

The number of consumed calories and the number of steps in a predetermined period (based on the moving distance)

The lifestyle and the behavioral habit of the user (for example, that the user goes to a particular place (for example, school, a beauty salon, or the like), that the user does not frequently go out on holidays, that the user usually moves from station A to station B)

For example, the transmission condition may be that the user passes through a range with respect to an advertisement place by foot three times a week", or that the user passes through a range with respect to an advertisement place between 1 p.m. and 6 p.m. three times a week". Similarly to the above example embodiment, it is possible, using position information, to determine whether or not the transmission condition as described above is satisfied.

Further, the transmission condition may include a condition regarding the execution history of an application executed in the user terminal 2. For example, the transmission condition may be that the user terminal 2 executes a predetermined application", that the user terminal 2 executes a predetermined application with a predetermined frequency", or the like. At this time, the server 1 may transmit an advertisement regarding a product or a service related to the application regarding the transmission condition to the user terminal 2. For example, if the transmission condition that "the user terminal 2 executes a dance game" is satisfied, the server 1 may transmit an advertisement regarding a dance class to the user terminal 2. Further, for example, if the transmission condition that "the user terminal 2 executes an application for health management three times or more a week" is satisfied, the server 1 may transmit an advertisement regarding health food or a health-enhancing product to the user terminal 2.

It should be noted that if the transmission condition includes a condition regarding the execution history of an application, the user terminal 2 stores, in the storage section 23, history information indicating the history of execution of the application and transmits the history information to the server 1 at appropriate timing. For example, the history information may be transmitted at timing when the execution of the application is ended, or may be transmitted in accordance with the arrival of timing determined in advance. The server 1 may determine the transmission condition using the history information received from the user terminal 2.

Further, the transmission condition may be a condition regarding the history of an advertisement reproduced in (or received by) the user terminal 2. For example, the transmission condition may be that "an advertisement of a product of a certain type is reproduced a predetermined number of times or more", or that "an advertisement of a certain advertiser is reproduced a predetermined number of times or more".

(Variation in Which Number of Advertisements to be Received is Limited by User Terminal 2)

In another example embodiment, if the number of advertisements that have not been viewed (reproduced) may be limited in the user terminal 2. That is, the number of advertisements that have not been viewed among advertisements stored in the user terminal 2 reaches a predetermined upper limit, and even if a new advertisement to be transmitted occurs as a result of the satisfaction of the transmission condition, the server 1 may not transmit the new advertisement. It should be noted that the determination of whether or not the number of advertisements that have not been viewed reaches the upper limit may be made by storing information of an advertisement transmitted to the user terminal 2 and the above viewed information with respect to each user. Further, the above determination may be made by the user terminal 2.

Based on the above, if advertisements that have not yet been viewed are accumulated, and the number of the advertisements reaches the upper limit, the user terminal 2 cannot receive a new advertisement. Consequently, it is possible to urge a user wanting points by reproducing an advertisement or a user wanting to watch a new advertisement, to view an advertisement so as not to accumulate advertisements that have not yet been viewed. That is, it is possible to more strongly provide a user with a motivation to reproduce an advertisement. This can increase advertising effectiveness.

(Variation Regarding Information Processing Executed by Server and User Terminal)

In the above example embodiment, the server 1 and the user terminal 2 execute various types of information processing (for example, the series of processes of steps S5 to S13 shown in FIG. 5). Here, in another example embodiment, part of the processing executed by the server 1 in the above example embodiment may be executed by the user terminal 2, or part of the processing executed by the user terminal 2 in the above example embodiment may be executed by the server 1. For example, the process of determining a transmission condition may be executed by the user terminal 2. That is, the user terminal 2 may store in advance some of transmission conditions stored in the server 1, and if position history information is acquired, may determine whether or not a transmission condition is satisfied. Further, if the transmission condition is satisfied, the user terminal 2 may request the server 1 to transmit an advertisement corresponding to the satisfied transmission condition, and may receive the advertisement transmitted from the server 1 in accordance with the request. It should be noted that the user terminal 2 may acquire a transmission condition together with an advertisement associated with the transmission condition from the server 1 in advance, and if the transmission condition is satisfied, may reproduce the advertisement associated with the satisfied transmission condition.

Figure 24:
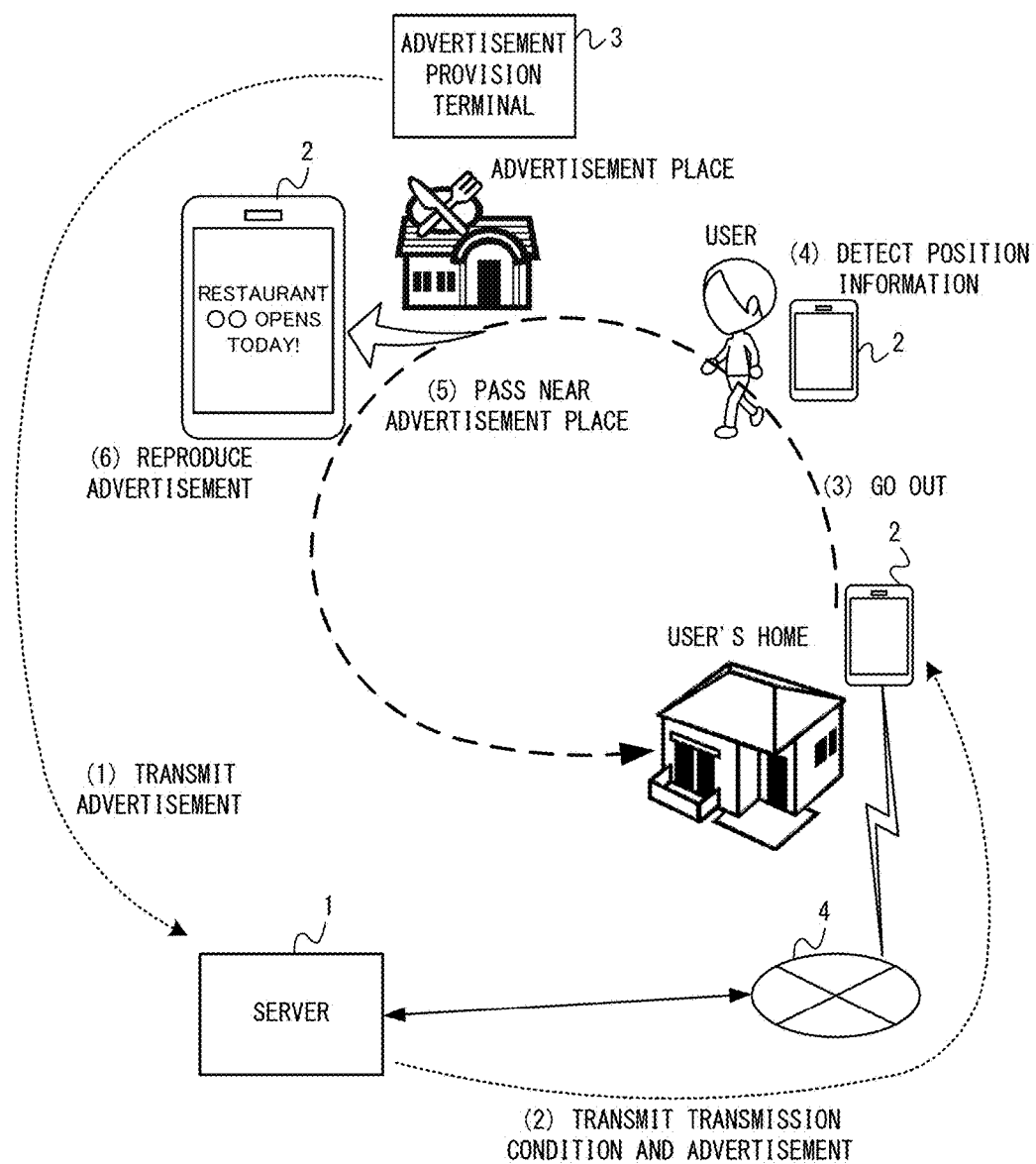
FIG. 24 is a diagram showing a non-limiting example of the operation of an information processing system according to a variation of the example embodiment.

In the above description, each apparatus in the information processing system may operate as follows, for example. FIG. 24 is a diagram showing an example of the operation of an information processing system according to a variation of the above example embodiment. Also in the variation shown in FIG. 24, similarly to the above example embodiment, an advertiser creates an advertisement and transmits an advertisement registration request including the created advertisement to a server 1, using an advertisement provision terminal 3 ((1) shown in FIG. 24). Here, in the present variation, the server 1 transmits an advertisement and a transmission condition corresponding to the advertisement to a user terminal 2 before a user goes out ((2) shown in FIG. 24). It should be noted that an advertisement and a transmission condition to be transmitted may be determined in any manner. For example, based on position history information received from the user terminal 2 in the past, the server 1 may determine an advertisement and a transmission condition to be transmitted. Alternatively, for example, the server 1 may transmit to the user terminal 2 an advertisement and a transmission condition that coincide with a region and/or a genre (for example, the type of business) specified by the user in advance.

Also in the above variation, similarly to the above example embodiment, the user goes out carrying the user terminal 2 with the user ((3) shown in FIG. 24). While the user is out, the user terminal 2 successively detects position information indicating the position of the user terminal 2 ((4) shown in FIG. 24). In the present variation, while the user is out, the user terminal 2 determines whether or not the detected position information satisfies the transmission condition received from the server 1. This determination is made at any timing while the user is out. For example, the above determination may be made every time the position information is detected, or may be made at predetermined time intervals while the user is out.

If the transmission condition is satisfied, the user terminal 2 reproduces the advertisement corresponding to the transmission condition. That is, in the example shown in FIG. 24, if the user passes near an advertisement place ((5) shown in FIG. 24), the advertisement regarding the advertisement place is reproduced in the user terminal 2 ((6) shown in FIG. 24). Thus, according to the present variation, the user can watch the advertisement near the advertisement place. Thus, it is possible to present the advertisement to the user at more effective timing. It should be noted that before the reproduction of the advertisement is started, the user terminal 2 may notify the user of the start by, for example, a sound, a vibration, and/or the like.

Alternatively, in another example embodiment, the process of determining a visit condition and/or the process of managing (for example, giving) a privilege may be executed by the user terminal 2. Alternatively, in another example embodiment, the user terminal 2 may successively transmit successively detected position information to the server 1, and the server 1 may generate position history information.

Alternatively, in another example embodiment, the function of the user terminal 2 may be achieved by a plurality of information processing apparatuses. For example, the information processing system may include, instead of the user terminal 2 as an apparatus on the terminal side (the user side), a first terminal apparatus having the function of detecting a position, and a second terminal apparatus having the function of reproducing an advertisement. It should be noted that the first terminal apparatus may be a mobile apparatus (for example, a smartphone, a wearable terminal, or the like) that can be carried by the user, and the second apparatus may be a mobile game apparatus that can be carried by the user (or that does not have the function of detecting a position in this case), or a stationary apparatus installed in the user's home (for example, a personal computer, a stationary game apparatus, or the like). At this time, the first terminal apparatus detects a position and transmits information of the detected position to the second terminal apparatus. Based on the information of the position received from the first terminal apparatus (a transmission condition may be determined on the terminal side or the server side), the second terminal apparatus reproduces an advertisement.

As described above, the above example embodiment can be used as, for example, an information processing apparatus, a server system, and a user terminal apparatus in order, for example, to effectively obtain advertising effectiveness.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system comprising a plurality of user terminals and a server configured for communicating with each user terminal,
    the server comprising one or more processors configured to control the server to transmit content to a user terminal,
    each user terminal comprising one or more processors configured to control the user terminal to at least:
        execute a first program for displaying content, thereby displaying on a display apparatus the content received from the server;
        store, in a storage, related image information indicating a related image related to the content; and
        determine (i) a number of times that the content displayed on the display apparatus is viewed, and/or (ii) an amount of reproduction time of the content;
        determine whether (i) the number of times that the content displayed on the display apparatus is viewed reaches a predetermined number of times, and/or (ii) the amount of reproduction time of the content reaches a predetermined amount of time;
        when executing a second program, which is a program different from the first program and is executable by the user terminal, display on the display apparatus an image by changing an image based on execution of the second program, using the related image information, wherein the changing of the image based on execution of the second program using the related image information is performed based on a determination that (i) the number of times that the content displayed on the display apparatus is viewed has reached the predetermined number of times, and/or (ii) the amount of reproduction time of the content has reached the predetermined amount of time.

2. The information processing system according to claim 1, wherein
    the second program is a game program, and
    the one or more processors of the user terminal is configured to control the user terminal to display on the display apparatus a related image of an item related to the content.

3. The information processing system according to claim 1, wherein
    the second program is a program for displaying a map image representing a real world or a virtual world,
    the content is associated with a position in the real world or the virtual world, and
    the one or more processors of the user terminal is configured to control the user terminal to display the related image at the position associated with the content.

4. The information processing system according to claim 1, wherein
    the second program is a program for displaying a menu image for accepting an instruction to execute an application program, and
    the one or more processors of the user terminal is configured to control the user terminal to change at least part of a user interface image and/or a background image that are included in the menu image.

5. The information processing system according to claim 1, wherein
    the one or more processors of the user terminal is configured, in accordance with receiving the content from the server, to control the user terminal to permit the second program to display the related image.

6. The information processing system according to claim 1, wherein
    in accordance reproducing the content, the one or more processors of the user terminal is configured to control the user terminal to permit the second program to display the related image.

7. The information processing system according to claim 1, wherein
    the one or more processors of the user terminal is configured, based on position information regarding a position of the user terminal, to control the user terminal to determine whether or not a user visits a place relating to the content, and to permit the second program to display a related image related to the content related to the place visited by the user according to the determination.

8. The information processing system according to claim 1, wherein
    the one or more processors of the user terminal is configured, based on position information regarding a position of the user terminal, to control the user terminal to determine whether a user visits a place related to the content, and to change a display form of a related image related to the content relating to the place visited by the user according to the determination.

9. An information processing apparatus configured for communicating with a server for transmitting content to a user terminal,
    the information processing apparatus comprising one or more processors configured to control the information processing apparatus to perform operations comprising:
        executing a first program for displaying a content, thereby displaying on a display apparatus content received from the server;
        storing, in a storage, related image information indicating a related image related to the content;

determining (i) a number of times that the content displayed on the display apparatus is viewed, and/or (ii) an amount of reproduction time of the content;

determining whether (i) the number of times that the content displayed on the display apparatus is viewed reaches a predetermined number of times, and/or (ii) the amount of reproduction time of the content reaches a predetermined amount of time; and when executing a second program, which is a program different from the first program and executable by the user terminal, displaying on the display apparatus an image by changing an image based on execution of the second program, using the related image information, wherein the changing of the image based on execution of the second program using the related image information is performed based on a determination that (i) the number of times that the content displayed on the display apparatus is viewed has reached the predetermined number of times, and/or (ii) the amount of reproduction time of the content has reached the predetermined amount of time.

10. A non-transitory computer-readable storage medium having stored therein an information processing program for execution by a computer of an information processing apparatus configured for communicating with a server for transmitting content to a user terminal, the information processing program, when executed, causing the computer to perform operations comprising:

executing a first program for displaying content, thereby displaying on a display apparatus content received from the server;

storing, in a storage, related image information indicating a related image related to the content;

determining (i) a number of times that the content displayed on the display apparatus is viewed, and/or (ii) an amount of reproduction time of the content;

determining whether (i) the number of times that the content displayed on the display apparatus is viewed reaches a predetermined number of times, and/or (ii) the amount of reproduction time of the content reaches a predetermined amount of time; and when executing a second program, which is a program different from the first program and executable by the user terminal, displaying on the display apparatus an image by changing an image based on execution of the second program, using the related image information, wherein the changing of the image based on execution of the second program using the related image information is performed based on a determination that (i) the number of times that the content displayed on the display apparatus is viewed has reached the predetermined number of times, and/or (ii) the amount of reproduction time of the content has reached the predetermined amount of time.

11. An information processing method for execution by an information processing system including a plurality of user terminals and a server configured for communicating with each user terminal, the server storing related image information indicating a related image related to content, the method comprising:

transmitting, by the server, content to the user terminal, executing, by the user terminal, a first program for displaying content, thereby displaying on a display apparatus content received from the server;

determining (i) a number of times that the content displayed on the display apparatus is viewed, and/or (ii) an amount of reproduction time of the content;

determining whether (i) the number of times that the content displayed on the display apparatus is viewed reaches a predetermined number of times, and/or (ii) the amount of reproduction time of the content reaches a predetermined amount of time; and when executing a second program, by the user terminal, which is a program different from the first program and is executable by the user terminal, displaying on the display apparatus an image by changing an image based on execution of the second program, using the related image information, wherein the changing of the image based on execution of the second program using the related image information is performed based on a determination that (i) the number of times that the content displayed on the display apparatus is viewed has reached the predetermined number of times, and/or (ii) the amount of reproduction time of the content has reached the predetermined amount of time.

* * * * *